(12) United States Patent
Hoshina et al.

(10) Patent No.: US 11,508,952 B2
(45) Date of Patent: Nov. 22, 2022

(54) SECONDARY BATTERY, BATTERY PACK, AND VEHICLE

(71) Applicant: KABUSHIKI KAISHA TOSHIBA, Tokyo (JP)

(72) Inventors: Keigo Hoshina, Yokohama Kanagawa (JP); Nen Zhang, Sagamihara Kanagawa (JP); Tetsuya Sasakawa, Yokohama Kanagawa (JP); Yasuhiro Harada, sehara Kanagawa (JP); Norio Takami, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 204 days.

(21) Appl. No.: 17/007,147

(22) Filed: Aug. 31, 2020

(65) Prior Publication Data
US 2021/0296631 A1    Sep. 23, 2021

(30) Foreign Application Priority Data

Mar. 19, 2020    (JP) .............................. JP2020-049410

(51) Int. Cl.
*H01M 4/131* (2010.01)
*H01M 4/134* (2010.01)
(Continued)

(52) U.S. Cl.
CPC ........... *H01M 4/131* (2013.01); *H01M 4/134* (2013.01); *H01M 4/5835* (2013.01);
(Continued)

(58) Field of Classification Search
None
See application file for complete search history.

(56) References Cited

U.S. PATENT DOCUMENTS

2017/0077510 A1    3/2017    Zhang
2017/0271661 A1*   9/2017    Yasuda ............... H01M 10/425
(Continued)

FOREIGN PATENT DOCUMENTS

JP    2017-059302 A    3/2017
JP    2018-160416 A    10/2018
(Continued)

OTHER PUBLICATIONS

Nakai et al., "Funmatsu X sen Kaiseki no Jissai" Reality of Powder X-Ray Analysis, X-Ray Analysis Investigation Conversazione, The Japan Society for Analytical Chemistry, written and edited by Izumi Nakai and Fujio Izumi (Asakura Publishing Co., Ltd), pp. 2002, with English translation.

*Primary Examiner* — Wyatt P McConnell
(74) *Attorney, Agent, or Firm* — Foley & Lardner LLP

(57) ABSTRACT

According to one embodiment, provided is a secondary battery including a positive electrode, a negative electrode, and an electrolyte. The negative electrode includes a niobium-titanium composite oxide having fluorine atoms on at least part of a surface the niobium-titanium composite oxide. An abundance ratio $A_F$ of fluorine atoms, an abundance ratio $A_{Ti}$ of titanium atoms, and an abundance ratio $A_{Nb}$ of niobium atoms on a surface of the negative electrode according to X-ray photoelectron spectroscopy satisfy a relationship of $3.5 \leq A_F/(A_{Ti}+A_{Nb}) \leq 50$.

11 Claims, 6 Drawing Sheets

(51) Int. Cl.
  *H01M 4/583*   (2010.01)
  *H01M 10/0525*  (2010.01)
  *H01M 50/20*   (2021.01)
  *H01M 4/02*   (2006.01)

(52) U.S. Cl.
  CPC ....... *H01M 10/0525* (2013.01); *H01M 50/20* (2021.01); *H01M 2004/021* (2013.01); *H01M 2004/027* (2013.01); *H01M 2004/028* (2013.01); *H01M 2220/20* (2013.01)

(56) References Cited

U.S. PATENT DOCUMENTS

2019/0296337 A1   9/2019   Yasuda
2020/0212441 A1   7/2020   Hara et al.

FOREIGN PATENT DOCUMENTS

JP      2019-169276 A    10/2019
WO    WO-2019/082338 A1    5/2019

* cited by examiner

SECONDARY BATTERY, BATTERY PACK, AND VEHICLE

CROSS-REFERENCE TO RELATED APPLICATION

This application is based upon and claims the benefit of priority from Japanese Patent Application No. 2020-049410, filed Mar. 19, 2020, the entire content of which is incorporated herein by reference.

FIELD

The present disclosure relates to a secondary battery, battery pack, and vehicle.

BACKGROUND

There is a wide range of application for secondary batteries such as lithium ion secondary batteries, including installation in portable devices or hybrid electric vehicles. When applied to hybrid electric vehicles and the like that demand high input-output performance of batteries, the batteries are generally used with a limit placed on capacity. For example, the batteries are used at approximately 30% to 70% of the capacity that can be taken out in an operation range. That is, the batteries used for application of high input and output tend to be charged/discharged shallowly.

DETAILED DESCRIPTION

Figure 1:
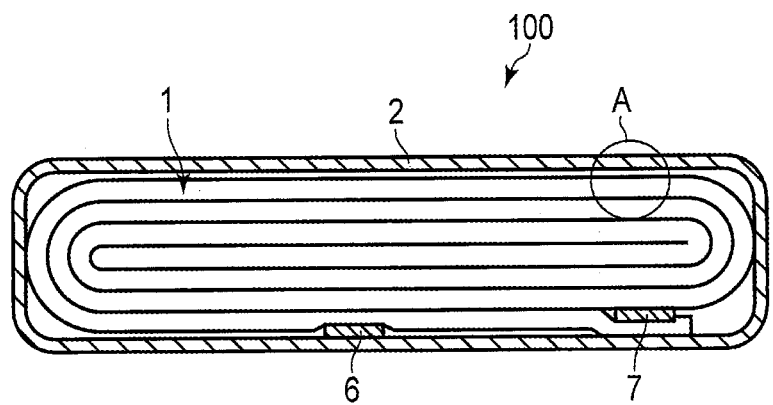
FIG. 1 is a cross-sectional view schematically showing an example of a secondary battery according to an embodiment.

According to one embodiment, provided is a secondary battery including a positive electrode, a negative electrode, and an electrolyte. The negative electrode includes a niobium-titanium composite oxide having fluorine atoms on at least part of a surface the niobium-titanium composite oxide. An abundance ratio $A_F$ of fluorine atoms, an abundance ratio $A_{Ti}$ of titanium atoms, and an abundance ratio $A_{Nb}$ of niobium atoms on a surface of the negative electrode according to X-ray photoelectron spectroscopy satisfy a relationship of $3.5 \leq A_F/(A_{Ti}+A_{Nb}) \leq 50$.

According to another embodiment, provided is a battery pack including the secondary battery according to the above embodiment.

According to a further other embodiment, provided is a vehicle including the battery pack according to the above embodiment.

In a battery, in addition to a charge-discharge reaction, a side reaction between each electrode and an electrolyte may occur. For example, the side reaction may result in the generation of gas inside the battery. When a battery using the niobium-titanium composite oxide such as $TiNb_2O_7$ in the negative electrode is used in a shallow charge-discharge range, the side reaction on the negative electrode tends to advance faster than that on the positive electrode. Thus, a shift of operation window (SOW) between the positive and negative electrodes is likely to occur, leading to deterioration due to an increase in the positive electrode potential.

Hereinafter, embodiments will be described with reference to the drawings. The same reference signs are applied to common components throughout the embodiments and overlapping explanations are omitted. Each drawing is a schematic view for explaining the embodiment and promoting understanding thereof; though there may be differences in shape, size and ratio from those in an actual device, such specifics can be appropriately changed in design taking the following explanations and known technology into consideration.

First Embodiment

According to a first embodiment, provided is a secondary battery including a positive electrode, a negative electrode, and an electrolyte. The negative electrode includes a niobium-titanium composite oxide. The niobium-titanium composite oxide has fluorine atoms on at least part of a surface thereof. When a relationship between an abundance ratio $A_F$ of fluorine atoms, an abundance ratio $A_{Ti}$ of titanium atoms, and an abundance ratio $A_{Nb}$ of niobium atoms on a surface of the negative electrode according to X-ray photoelectron spectroscopy is represented by a ratio $A_F/(A_{Ti}+A_{Nb})$, the ratio is within a range of from 3.5 to 50.

The secondary battery according to the first embodiment may further include a separator provided between the positive electrode and the negative electrode. The negative electrode, the positive electrode, and the separator may configure an electrode group. The electrolyte may be held in the electrode group.

The secondary battery according to the first embodiment may further include a container member that houses the electrode group and the electrolyte.

Moreover, the secondary battery according to the first embodiment may further include a negative electrode terminal electrically connected to the negative electrode and a positive electrode terminal electrically connected to the positive electrode.

The secondary battery according to the first embodiment may be, for example, a lithium secondary battery. The secondary battery also includes nonaqueous electrolyte secondary batteries containing nonaqueous electrolyte(s).

When the negative electrode containing the niobium-titanium composite oxide has a surface state in which the above-described ratio $A_F/(A_{Ti}+A_{Nb})$ is within the range from 3.5 to 50, it is possible to suppress the side reaction at the negative electrode even when the negative electrode is used in a shallow charge-discharge range. The negative electrode having the surface state in which fluorine atoms, titanium atoms, and niobium atoms are present in such a relationship may be a negative electrode in which a coating-film containing fluorine is formed on the niobium-titanium composite oxide surface, at the surface of the negative electrode that contains the niobium-titanium composite oxide. The negative electrode may include a negative electrode active material-containing layer that contains the niobium-titanium composite oxide as the negative electrode active material, for example; given this, the negative electrode surface in which fluorine atoms are present as described herein may be a surface of the active material-containing layer. By having the niobium-titanium composite oxide contained in the negative electrode as the negative electrode active material being at least partly covered with the fluorine-containing coating-film, the progress of the side reaction in the negative electrode slows down. As a result, the shift of operation window between the positive and negative electrodes can be reduced.

In each of the positive electrode and the negative electrode, self-discharge advances in association with the side reaction. Therefore, if the side reaction rate of one between the positive electrode and the negative electrode is faster than that of the other, the rate of progress of the self-discharge differs, resulting in a shift of the state of charge between the positive and negative electrodes, i.e. the shift of operation window. When the side reaction in the negative electrode is faster than that in the positive electrode, because of a difference in a self-discharge amount, a state of charge (SOC) of the negative electrode becomes shifted to a lower direction as compared to the state of charge of the positive electrode. The SOC of the positive electrode does not drop to the state for that at the time of discharge, even in a state where the end stage of discharge for the negative electrode is reached, and the positive electrode potential remains high in the battery in the state of discharge. If the battery is charged in this state, either the negative electrode is shallowly charged or the positive electrode is deeply charged. Consequently, the positive electrode is apt to reach an overcharged state, whereby deterioration of the positive electrode may proceed. In contrast, when the side reaction in the negative electrode is slower than that in the positive electrode, because of the difference in the self-discharge amount, the SOC of the negative electrode is shifted to a higher direction as compared to the SOC of the positive electrode, and when the battery is charged, the negative electrode may be brought to an overcharged state and become deteriorated.

The negative electrode, in which the fluorine atoms are present on the surface of the niobium-titanium composite oxide in an amount such that the negative electrode surface state is one where the ratio $A_F/(A_{Ti}+A_{Nb})$ is within the range from 3.5 to 50, may be in a state where a fluorine-containing coating-film suitable for aligning the rate of the side reaction in the negative electrode and that in the positive electrode to a similar level is formed on the niobium-titanium composite oxide. Thereby, even if the battery is used in a shallow charge-discharge range, shift of operation window between the positive and negative electrodes does not occur easily, and high life performance can be demonstrated. The ratio $A_F/(A_{Ti}+A_{Nb})$ on the surface of the negative electrode as observed by X-ray Photoelectron Spectroscopy (XPS) being 3.5 or more indicates that the niobium-titanium composite oxide is sufficiently covered with the fluorine-containing coating-film. Covering with the fluorine-containing coating-film suppresses the side reaction on the niobium-titanium composite oxide surface. The ratio $A_F/(A_{Ti}+A_{Nb})$ being 50 or less indicates that the fluorine-containing coating-film has not been excessively formed on the niobium-titanium composite oxide. The negative electrode surface preferably has a surface state satisfying the relationship of $4.5 \leq A_F/(A_{Ti}+A_{Nb}) \leq 11$. The surface state satisfying the relationship of $5.3 \leq A_F/(A_{Ti}+A_{Nb}) \leq 10.5$ is more preferable.

The negative electrode may further include a lithium-containing coating-film that at least partially covers the surface of the niobium-titanium composite oxide. Because the lithium-containing coating-film has low covering ability with respect of the niobium-titanium composite oxide, the suppression effect on the side reaction is not high. Therefore, the amount of lithium-containing coating-film on the niobium-titanium composite oxide may be small. The abundance ratio $A_{Li}$ of lithium atoms and the abundance ratio $A_F$ according to XPS on the surface of the negative electrode preferably satisfy the relationship of $0.2 \leq A_{Li}/A_F \leq 1$.

The surface state satisfying the ratio $A_F/(A_{Ti}+A_{Nb})$ of the above-described range can be obtained by forming a fluorine-containing coating-film on the surface of the niobium-titanium composite oxide included in the negative electrode in the following manner.

First, a positive electrode, a negative electrode containing a niobium-titanium composite oxide, and an electrolyte are housed in a container member of a battery, and the container member is sealed by depressurizing, thereby assembling a preliminary battery. The prepared preliminary battery is adjusted to have an SOC of 60% to 90%, and in this state, charging pulse of 5 seconds to 30 seconds is applied at a current value of from 5 C to 10 C. Charging pulses may be applied multiple times. It is desirable to repeat multiple applications of charging pulse. The environmental temperature is set to 20° C. to 45° C.

By subjecting the preliminary battery to a short period (from 5 to 30 seconds) overvoltage state by charging pulse, the negative electrode potential is instantaneously shifted to a low potential. Whereby, not only can a coating-film be formed on the niobium-titanium composite oxide by virtue of subjecting the negative electrode to a low potential, but deterioration of the negative electrode that may occur as a consequence of leaving the negative electrode for a long time in a state of low potential can be avoided. Therefore, it is desirable to repeat the short-period overvoltage pulse than to maintain a constant voltage over a long period of time.

After charging pulse is applied, the depressurizing sealing may be performed again. By performing the depressurizing sealing again, gas that may be generated in the container member during the charging pulse treatment can be removed.

When the above-described charging pulse treatment is performed, it is desirable that a lithium salt containing fluorine such as $LiPF_6$ be contained. At least a part of the fluorine-containing coating-film may be derived from the lithium salt containing the fluorine.

By applying overvoltage pulse in a state in which the electrolyte contains a compound as a nitrogen source, a compound as a sulfur source, and a compound as a silicon source, it is possible to include nitrogen (N) atoms and/or sulfur (S) atoms and/or silicon (Si) atoms on the negative electrode surface, for example, as a coating-film containing these atoms. It is more preferable to include such a coating-film containing nitrogen, sulfur or silicon on the negative electrode in addition to the fluorine-containing coating-film, in view of suppressing the side reaction due to decomposition of the electrolyte at the negative electrode.

(Measurement Method)

Hereinafter, a description will be given of various measurement methods for the secondary battery. Specifically, a description will be given of a method of examining active materials contained in a negative electrode, a method of performing X-ray photoelectron spectroscopy (XPS) measurement on a negative electrode surface, and a method of identifying solvent components contained in an electrolyte.

First, the battery is put into a discharged state. The discharged state as described herein refers to a state where the battery is subjected to a constant current discharge under a 25° C. environment at a current value of 0.2 C or less, to a discharge lower limit voltage. The battery put into the discharged state is placed into a glove box of inert atmosphere, for example, a glove box filled with argon gas. Next, the battery is disassembled within the glove box, and the target electrode is taken out from the battery. Specifically, within the glove box, the exterior of the battery is cut open, taking care not to short-circuit the positive electrode with the negative electrode, just in case. From the cut-open battery, for example, the electrode connected to the negative electrode-side terminal is cut out, in the case that the electrode used as negative electrode is to be made the measurement sample. The electrode thus taken out is washed, with a methyl ethyl carbonate (MEC) solution, for example. Li salt adsorbed on the electrode surface is removed by the washing, and thereafter, the electrode is dried.

<Method of Examining Active Material>

Using the electrode obtained by the above-described procedure as a sample, the composition of active material included in the electrode, for example, in the active material-containing layer can be examined by combining elemental analysis with a scanning electron microscope equipped with an energy dispersive X-ray spectrometry scanning apparatus (scanning electron microscope-energy dispersive X-ray spectrometry; SEM-EDX), X-ray diffraction (XRD) measurement, and inductively coupled plasma (ICP) emission spectrometry. By SEM-EDX analysis, shapes of components contained in the active material-containing layer and compositions of the components contained in the active material-containing layer (each element from B to U in the periodic table) can be known. The elements in the active material-containing layer can be quantified by ICP measurement. Crystal structures of materials included in the active material-containing layer can be examined by XRD measurement.

A cross-section of the electrode extracted as described above is cutout by Ar ion milling. The cutout cross-section is observed with the SEM. Sampling is also performed in an inert atmosphere such as argon or nitrogen to avoid exposure to the air. Several particles are selected from SEM images at 3000-fold magnification. Here, particles are selected such that a particle diameter distribution of the selected particles becomes as wide as possible.

Next, elemental analysis is performed on each selected particle by EDX. Accordingly, it is possible to specify kinds and quantities of elements other than Li among the elements contained in each selected particle.

With regard to Li, information regarding the Li content in the entire active material can be obtained by ICP emission spectrometry. ICP emission spectrometry is performed according to the following procedure.

From the dried electrode, a powder sample is prepared in the following manner. The active material-containing layer is dislodged from the current collector and ground in a mortar. The ground sample is dissolved with acid to prepare a liquid sample. Here, hydrochloric acid, nitric acid, sulfuric acid, hydrogen fluoride, and the like may be used as the acid. The components included in the active material being measured can be found by subjecting the liquid sample to ICP analysis.

Crystal structure(s) of compound(s) included in each of the particles selected by SEM can be specified by XRD measurement. XRD measurement is performed within a measurement range where $2\theta$ is from 5 degrees to 90 degrees, using CuK$\alpha$ ray as a radiation source. By this measurement, X-ray diffraction patterns of compounds contained in the selected particles can be obtained.

As an apparatus for XRD measurement, SmartLab manufactured by Rigaku is used, for example. Measurement is performed under the following conditions:

X ray source: Cu target
Output: 45 kV, 200 mA
soller slit: 5 degrees in both incident light and received light
step width ($2\theta$): 0.02 deg
scan speed: 20 deg/min
semiconductor detector: D/teX Ultra 250
sample plate holder: flat glass sample plate holder (0.5 mm thick)
measurement range: range of $5° \leq 2\theta \leq 90°$ When another apparatus is used, in order to obtain measurement results equivalent to those described above, measurement using a standard Si powder for powder X-ray diffraction is performed, and measurement is conducted with conditions where peak intensities and peak-top positions correspond to those obtained using the above apparatus.

Conditions of the XRD measurement is set, such that an XRD pattern applicable to Rietveld analysis is obtained. In order to collect data for Rietveld analysis, specifically, the step width is made ⅓ to ⅕ of the minimum half width of the diffraction peaks, and the measurement time or X-ray intensity is appropriately adjusted in such a manner that the intensity at the peak position of strongest reflected intensity is 5,000 cps or more.

The XRD pattern obtained as described above is analyzed by the Rietveld method. In the Rietveld method, the diffraction pattern is calculated from the crystal structure model that has been estimated in advance. Here, estimation of the crystal structure model is performed based on analysis results of EDX and ICP. The parameters of the crystal structure (lattice constant, atomic coordinate, occupancy ratio, or the like) can be precisely analyzed by fitting all the calculated values with the measured values.

Through Rietveld analysis, the content of each active material can be estimated, in a case where plural active materials are included. A fitting parameter S is used as the scale for estimating the degree of agreement between the measured intensities and the calculated intensities in the Rietveld analysis. Analysis must be made in such a manner that the S value turns out less than 1.8. When determining the occupancies in each of the sites, the standard deviation $\sigma j$ must also be taken into consideration. The fitting parameter S and standard deviation of defined herein are estimated using the formula described in "Funmatsu X sen Kaisetsu no Jissai (Reality of Powder X-Ray Analysis)", 1st edition (2002), X-Ray Analysis Investigation Conversazione, The Japan Society for Analytical Chemistry, written and edited by Izumi Nakai and Fujio Izumi (Asakura Publishing Co., Ltd.).

XRD measurement can be performed with the electrode sample directly attached onto a glass holder of a wide-angle X-ray diffraction apparatus. At this time, an XRD spectrum is measured in advance in accordance with the species of metal foil of the electrode current collector, and the position(s) of appearance of the peak(s) derived from the collector is grasped. In addition, the presence/absence of peak(s) of mixed substances such as an electro-conductive agent or a binder is also grasped in advance. If the peak(s) of the current collector overlaps the peak(s) of the active material, it is desirable to perform measurement with the active material-containing layer removed from the current collector. This is in order to separate the overlapping peaks when quantitatively measuring the peak intensities. If the overlapping peaks can be grasped beforehand, the above operations can be omitted, of course.

Provided that the particles observed by the aforementioned SEM-EDX measurement contain Ti, Nb and O, and further that an X-ray diffraction pattern assigned to monoclinic is obtained from an electrode measured by the aforementioned XRD measurement, such results indicate that particles of monoclinic titanium-niobium composite oxide are present in the active material measured. When EDX measurement shows that the active material includes particles having contents of Ti and Nb that differ greatly, there is a possibility that the active material-containing layer contains plural of active materials. Amounts of elements contained in the active material in the electrode can be specified by ICP emission spectrometry according to the above procedure.

<X-Ray Photoelectron Spectroscopy Measurement>

The X-ray photoelectron spectroscopy (XPS) measurement can be carried out according to the method described below.

As an apparatus, for example, Quantera SXM, manufactured by ULVAC-PHI, is used. For the excitation X-ray source, single crystal spectral Al-Kα (1486.6 eV) is used, and the photoelectron detection angle is set to 45°.

After the electrode removed from the battery is washed and dried in the glove box according to the above-described procedure, the electrode is attached onto the XPS analysis sample holder. Introduction of the sample is performed in an inert atmosphere, e.g., nitrogen atmosphere.

An atomic ratio $A_F/(A_{Ti}+A_{Nb})$ of abundance ratio $A_F$ (atom %) of fluorine (F) atoms, abundance ratio $A_{Ti}$ (atom %) of titanium (Ti) atoms, and abundance ratio $A_{Nb}$ (atom %) of niobium (Nb) atoms on the electrode surface as measurement target is determined. Similarly, an atomic ratio $A_{Li}/A_F$ of abundance ratio $A_{Li}$ of lithium (Li) atoms and abundance ratio $A_F$ of F atoms on the electrode surface as measurement target is determined. The atomic abundance ratio (atom %) for each element is calculated by multiplying relative sensitivity factors (RSF) on a peak area with the background subtracted, for a peak of each element. A Shirley method is used to subtract the background. For each peak, two points of a starting point and ending point of the peak is taken, and the background is subtracted using the Shirley method.

From the above-described XPS analysis, F which is a coating-film component on the negative electrode surface, and Ti and Nb derived from the niobium-titanium composite oxide can be detected. Therefore, the ratio between the abundance ratio $A_F$ of F atoms and the sum of the abundance ratio $A_{Ti}$ of Ti atoms and the abundance ratio $A_{Nb}$ of Nb atoms on the electrode surface is an index indicating the proportion between the fluorine-containing coating-film that may be present on the electrode surface and the niobium-titanium composite oxide exposed on the electrode surface. Furthermore, it is possible to detect Li present on the negative electrode surface as a coating-film. The ratio between the abundance ratio $A_{Li}$ of Li atoms and the abundance ratio $A_F$ of F atoms on the electrode surface is an index indicating the proportion between the fluorine-containing coating-film and the lithium-containing coating-film that may be present on the electrode surface.

Whether nitrogen, sulfur, or silicon atoms are present on the electrode surface can also be examined by XPS analysis.

[Method of Identifying Solvent Components of Electrolyte]

A method of identifying components of a solvent included in the electrolyte will be described below.

First, the battery to be measured is discharged at 1 C until the battery voltage becomes 1.0 V. The discharged battery is disassembled inside a glove box in an inert atmosphere.

Then, the electrolyte included in the battery and the electrode group is extracted. If the electrolyte can be extracted from the unsealed part of the battery, sampling of the electrolyte is performed as is. On the other hand, if the electrolyte is held in the electrode group, the electrode group is further disassembled, and the separator impregnated with the electrolyte, for example, is extracted. The electrolyte impregnated into the separator can be extracted by using a centrifugal separator or the like. Thereby, sampling of the electrolyte can be performed. If the amount of the electrolyte included in the battery is small, the electrolyte can also be extracted by immersing the electrodes and the separator in an acetonitrile solution. The weight of the acetonitrile solution is measured before and after the extraction, so that the extraction amount can be calculated.

A sample of the electrolyte thus obtained is subjected to a gas chromatography mass spectrometer (GC-MS) to perform a composition analysis. In the analysis, the species of solvent included in the electrolyte is identified first. A calibration curve of the solvent species to be identified is then made. If multiple species are included in the electrolyte, a calibration curve for each solvent species is made. A mixing ratio of each species of solvent in the electrolyte can be calculated by comparing the calibration curve made and the peak intensity or area shown in the results obtained by measuring the sample of the electrolyte.

Hereinafter, the negative electrode, the positive electrode, the electrolyte, the separator, the container member, the negative electrode terminal, and the positive electrode terminal will be described in detail.

1) Negative Electrode

The negative electrode may include a current collector and a negative electrode active material-containing layer. The negative electrode active material-containing layer may be formed on one surface or both of reverse surfaces of the current collector. The negative electrode active material-containing layer includes a niobium-titanium composite oxide as negative electrode active material. The negative electrode active material-containing layer may optionally include an electro-conductive agent and a binder.

The fluorine atoms on the surface of the niobium-titanium composite oxide may be present on the surface of the negative electrode active material-containing layer. The surface of the negative electrode active material-containing layer may be at least partially covered with the coating-film containing fluorine atoms.

Examples of the niobium-titanium composite oxide include a monoclinic niobium-titanium composite oxide and an orthorhombic Na-containing niobium-titanium composite oxide.

Examples of the monoclinic niobium-titanium composite oxide include a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: $0 \leq x \leq 5$, $0 \leq y < 1$, $0 \leq z < 2$, and $-0.3 \leq \delta \leq 0.3$. Specific examples of the monoclinic niobium-titanium composite oxide include $Li_xNb_2TiO_7$ (0≤x≤5).

Another example of the monoclinic niobium-titanium composite oxide is a compound represented by $Li_xTi_{1-y}M3_{y+z}Nb_{2-z}O_{7-\delta}$. Here, M3 is at least one selected from the group consisting of Mg, Fe, Ni, Co, W, Ta, and Mo. The respective subscripts in the composition formula are specified as follows: 0≤x<5, 0≤y<1, 0≤z<2, and −0.3≤δ≤0.3.

An example of the orthorhombic Na-containing niobium-titanium composite oxide includes a compound represented by $Li_{2+v}Na_{2-w}M4_uTi_{6-s-t}Nb_sM5_tO_{14+\delta}$. Here, M4 is at least one selected from the group consisting of Cs, K, Sr, Ba and Ca, and M5 is at least one selected from the group consisting of Zr, Sn, V, Ta, Mo, W, Fe, Co, Mn and Al. In the compositional formula, the respective subscripts are 0≤v≤4, 0<w<2, 0≤u<2, 0<s<6, 0≤t<3, s+t<6, and −0.5≤δ≤0.5.

The active material-containing layer may contain solely one niobium-titanium composite oxide, or two or more niobium-titanium composite oxides. Moreover, the active material-containing layer may contain a mixture obtained by mixing one or two or more niobium-titanium composite oxides further with one or two or more other active materials.

Examples of active materials other than niobium-titanium composite oxide include lithium titanate having a ramsdellite structure (e.g., $Li_{2+j}Ti_3O_7$, 0≤j≤3), lithium titanate having a spinel structure (e.g., $Li_{4+j}Ti_5O_{12}$, 0≤j≤3), monoclinic titanium dioxide ($TiO_2$), anatase titanium dioxide, rutile titanium dioxide, a hollandite titanium composite oxide, an orthorhombic titanium composite oxide other than the above orthorhombic Na-containing niobium-titanium composite oxide.

Examples of the orthorhombic titanium-containing composite oxide include a compound represented by $Li_{2+a}M6_{2-b}Ti_{6-c}M7_dO_{14+\sigma}$. Here, M6 is at least one selected from the group consisting of Sr, Ba, Ca, Mg, Na, Cs, Rb and K. M7 is at least one selected from the group consisting of Zr, Sn, V, Nb, Ta, Mo, W, Y, Fe, Co, Cr, Mn, Ni and Al. The respective subscripts in the composition formula are specified as follows: 0≤a≤6, 0≤b<2, 0≤c<6, 0≤d<6, and −0.5≤σ≤0.5. Specific examples of the orthorhombic titanium-containing composite oxide include $Li_{2+a}Na_2Ti_6O_{14}$ (0≤a≤6).

The electro-conductive agent is added to improve current collection performance and to suppress contact resistance between the active material and the current collector. Examples of the electro-conductive agent include carbonaceous substances such as vapor grown carbon fiber (VGCF), carbon blacks such as acetylene black, graphite, graphene, carbon nanofiber, and carbon nanotubes. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber (SBR), polyacrylate compounds, urethane copolymers, imide compounds, carboxymethyl cellulose (CMC), and salts of CMC. The polyacrylate compounds include polyacrylic acid, polyacrylonitrile, acrylic copolymers, and urethane copolymers. One of these may be used as the binder, or alternatively, two or more may be used in combination as the binder.

Of the compounds described above, it is desirable that the negative electrode contain at least one selected from the group consisting of carboxymethyl cellulose, styrene-butadiene rubber, polyacrylic acid, polyacrylonitrile, acrylic copolymer, and urethane copolymer, which are water dispersion binders. These water dispersion binders have high affinity with constituent members of the negative electrode, such as the negative electrode active material, and are apt to be in wide contact with the surface of the negative electrode active material. For example, PVdF tends to bind to the active material surface in a point-like distribution, whereas a water dispersion binder tends to spread over an area along the active material surface. Therefore, the water dispersion binder itself covers the negative electrode active material as a coating-film, and may provide, for example, the effect of reducing gas generation that may occur when the negative electrode potential is dropped due to charging pulse.

The blending proportion of negative electrode active material, electro-conductive agent and binder in the negative electrode active material-containing layer is preferably as follows. The negative electrode active material, electro-conductive agent and binder are preferably blended in proportions of 68% by mass to 96% by mass, 2% by mass to 30% by mass, and 2% by mass to 30% by mass, respectively. When the amount of electro-conductive agent is 2% by mass or more, the current collection performance of the negative electrode active material-containing layer can be improved. When the amount of binder is 2% by mass or more, binding between the active material-containing layer and current collector is sufficient, and excellent cycling performances can be expected. On the other hand, an amount of each of the electro-conductive agent and binder is preferably 30% by mass or less, in view of increasing the capacity.

There may be used for the current collector, a material which is electrochemically stable at the potential (vs. $Li/Li^+$) at which lithium (Li) is inserted into and extracted from the negative electrode active material. For example, the current collector is preferably made of copper, nickel, stainless steel, aluminum, or an aluminum alloy including one or more selected from the group consisting of Mg, Ti, Zn, Mn, Fe, Cu, and Si. The thickness of the current collector is preferably from 5 μm to 20 μm. The current collector having such a thickness can maintain balance between the strength and weight reduction of the negative electrode.

The current collector may include a portion where the negative electrode active material-containing layer is not formed on a surface thereof. This portion may serve as a negative electrode current collecting tab.

The density of the negative electrode active material-containing layer (excluding the current collector) is preferably from 1.8 g/cm³ to 2.8 g/cm³. The negative electrode, in which the density of the negative electrode active material-containing layer is within this range, is excellent in energy density and ability to hold the electrolyte. The density of the negative electrode active material-containing layer is more preferably from 2.1 g/cm³ to 2.6 g/cm³.

The negative electrode may be produced by the following method, for example. First, negative electrode active material, electro-conductive agent, and binder are suspended in a solvent to prepare a slurry. The slurry is applied onto one surface or both of reverse surfaces of a current collector. Next, the applied slurry is dried to form a stack of negative electrode active material-containing layer(s) and current collector. Then, the stack is subjected to pressing. The negative electrode can be produced in this manner.

Alternatively, the negative electrode may also be produced by the following method. First, negative active material, electro-conductive agent, and binder are mixed to obtain a mixture. Next, the mixture is formed into pellets. Then the negative electrode can be obtained by arranging the pellets on the current collector.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one species of compound as the positive electrode active material, or alternatively, include two or more species of compounds in combination. Examples of the oxide and sulfide include compounds capable of having Li and Li ions be inserted and extracted.

Examples of such compounds include manganese dioxide ($MnO_2$), iron oxides, copper oxides, nickel oxides, lithium manganese composite oxides (e.g., $Li_eMn_2O_4$ or $Li_eMnO_2$; $0<e\leq1$), lithium nickel composite oxides (e.g., $Li_eNiO_2$; $0<e\leq1$), lithium cobalt composite oxides (e.g., $Li_eCoO_2$; $0<e\leq1$), lithium nickel cobalt composite oxides (e.g., $Li_eNi_{1-f}Co_fO_2$; $0<e\leq1$, $0<f<1$), lithium manganese cobalt composite oxides (e.g., $Li_eMn_fCo_{1-f}O_2$; $0<e\leq1$, $0<f<1$), lithium manganese nickel composite oxides having a spinel structure (e.g., $Li_eMn_{2-m}Ni_mO_4$; $0<e\leq1$, $0<m<2$), lithium phosphates having an olivine structure (e.g., $Li_eFePO_4$; $0<e\leq1$, $Li_eFe_{1-n}Mn_nPO_4$; $0<e\leq1$, $0<n\leq1$, $Li_eCoPO_4$; $0<e\leq1$), iron sulfates ($Fe_2(SO_4)_3$), vanadium oxides (e.g., $V_2O_5$), and lithium nickel cobalt manganese composite oxides ($Li_eNi_{1-f-g}Co_fMn_gO_2$; $0<e\leq1$, $0<f<1$, $0<g<1$, $f+g<1$).

Among the above, examples of compounds more preferable as the positive electrode active material include lithium manganese composite oxides having a spinel structure (e.g., $Li_eMn_2O_4$; $0<e\leq1$), lithium nickel composite oxides (e.g., $LieNiO_2$; $0<e\leq1$), lithium cobalt composite oxides (e.g., $LieCoO_2$; $0<e\leq1$), lithium nickel cobalt composite oxides (e.g., $Li_eNi_{1-f}Co_fO_2$; $0<e\leq1$, $0<f<1$), lithium manganese nickel composite oxides having a spinel structure (e.g., $Li_eMn_{2-m}Ni_mO_4$; $0<e\leq1$, $0<m<2$), lithium manganese cobalt composite oxides (e.g., $Li_eMn_fCo_{1-f}O_2$; $0<e\leq1$, $0<f<1$), lithium iron phosphates (e.g., $Li_eFePO_4$; $0<e\leq1$), and lithium nickel cobalt manganese composite oxides ($Li_eNi_{1-f-g}Co_fMn_gO_2$; $0<e\leq1$, $0<f<1$, $0<g<1$, $f+g<1$). The positive electrode potential can be made high by using these compounds as positive electrode active material.

When a room temperature molten salt is used as the electrolyte of the battery, it is preferable to use a positive electrode active material including lithium iron phosphate, $Li_kVPO_4F$ ($0\leq k\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle diameter of the positive electrode active material is preferably from 100 nm to 1 μm. The positive electrode active material having a primary particle size of 100 nm or more is easy to handle during industrial production. In the positive electrode active material having a primary particle size of 1 μm or less, in-solid diffusion of lithium ions can proceed smoothly.

The specific surface area of the positive electrode active material is preferably from 0.1 $m^2$/g to 10 $m^2$/g. The positive electrode active material having a specific surface area of 0.1 $m^2$/g or more can secure sufficient sites for inserting and extracting Li ions. The positive electrode active material having a specific surface area of 10 $m^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE) polyvinylidene fluoride (PVdF), fluorine rubber, polyacrylate compounds, imide compounds, carboxymethyl cellulose (CMC), and salts of CMC. One of these may be used as the binder, or alternatively, two or more may be used in combination as the binder.

The electro-conductive agent is added to improve current collection performance and to suppress the contact resistance between the positive electrode active material and the positive electrode current collector. Examples of electro-conductive agent include carbonaceous substances such as vapor grown carbon fiber (VGCF), carbon black such as acetylene black, and graphite. One of these may be used as the electro-conductive agent, or alternatively, two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, decomposition of electrolyte can be reduced during storage under high temperatures.

The positive electrode current collector is preferably an aluminum foil, or an aluminum alloy foil containing one or more selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of thereof. This portion may serve as a positive electrode current collecting tab.

The positive electrode may be produced, for example, by a method similar to that for the negative electrode, using the positive electrode active material in place of the negative electrode active material.

3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include fluorine-containing lithium salts such as lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bisfluorosulfonylimide ($LiN(SO_2F)_2$; LiTFSI), lithium bistrifluoromethylsulfonylimide [$LiN(CF_3SO_2)_2$; LiTFSI], and mixtures thereof. The electrolyte salt is preferably resistant to oxidation even at a high potential, and most preferably $LiPF_6$.

Another lithium salt such as lithium perchlorate ($LiClO_4$) may be further included together with the above lithium salts containing fluorine. The electrolyte desirably at least includes one or more of the above-described lithium salts that contain fluorine, as the electrolyte salt.

Examples of the organic solvent include cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); acetic esters such as ethyl acetate and methyl acetate; propionate esters such as ethyl propionate (EP) and methyl propionate; γ-butyrolactone (GBL), acetonitrile (AN), and sulfolane (SL). These organic solvents may be used singularly or as a mixed solvent.

As the organic solvent, the electrolyte desirably contains a mixture between the cyclic carbonates and/or the linear carbonates, and the acetate esters and/or the propionate esters. By using such a mixed solvent as the electrolyte, it is possible to reduce the viscosity of the electrolyte and to suppress an increase of viscosity in a low-temperature environment. Furthermore, ester compounds such as ethyl acetate, methyl acetate, ethyl propionate, and methyl propionate have lower oxidation resistance as compared to carbonate compounds such as cyclic carbonates and linear carbonates. These ester compounds may generate oxidative decomposition products by oxidative decomposition reaction in a nonaqueous electrolyte. The oxidative decomposition products of the ester compounds can exhibit the effect of suppressing decomposition of the electrolyte solvent on the positive electrode surface. It is desirable to use one or more of these ester compounds having relatively low oxidation resistance together with one or more cyclic carbonates and linear carbonates having higher oxidation resistance. The content of the ester compounds in the electrolyte is preferably from 10% to 60% by mass with respect to the electrolyte.

The electrolyte may contain one or more of a compound serving as a nitrogen source, a compound serving as a sulfur source, and a compound serving as a silicon source. Examples of the nitrogen source include isocyanate compounds such as diisocyanate hexane (DICNH); and nitrile compounds such as adiponitrile and succinonitrile (SN). Examples of the sulfur source include sultone compounds such as propane sultone (PS) and butane sultone; and sulfone compounds such as sulfolane. Examples of the silicon source include tristrimethylsilylphosphate (TMSP) and tristrimethylphosphite. As described above, when the above-described pulse charging treatment is applied to the battery in which the compounds as the nitrogen source, sulfur source, and silicon source are added to the electrolyte, a coating-film derived from these compounds can be formed on the negative electrode.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylindrical, coin-shaped, or button-shaped. The container member may be appropriately selected depending on battery size and use of the battery.

6) Negative Electrode Terminal

The negative electrode terminal may be made of a material that is electrochemically stable at the Li insertion/extraction potential of the aforementioned negative electrode active material, and having electrical conductivity. Specific examples of the material for the negative electrode terminal include copper, nickel, stainless steel, aluminum, and aluminum alloy containing at least one selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce contact resistance between the negative electrode terminal and the negative electrode current collector.

7) Positive Electrode Terminal

The positive electrode terminal may be made of a material that is electrically stable in the potential range of 3 V to 4.5 V (vs. Li/Li$^+$) relative to the redox potential of lithium, and having electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance between the positive electrode terminal and the positive electrode current collector.

Next, the secondary battery according to the first embodiment will be more concretely described with reference to the drawings.

Figure 2:
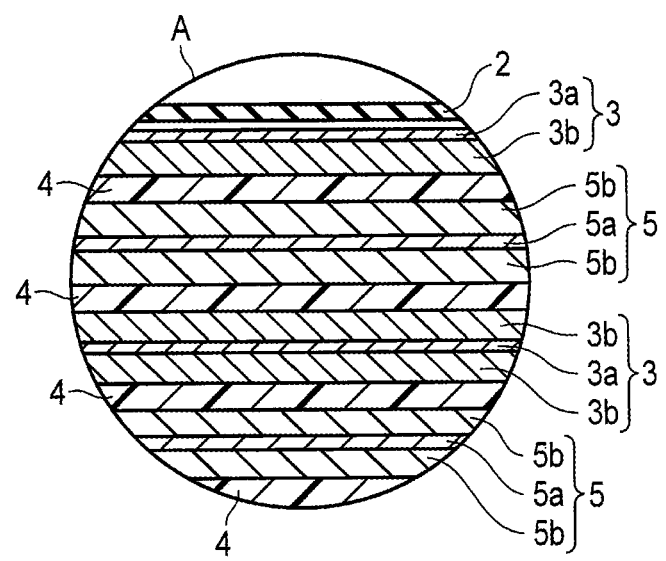
FIG. 2 is an enlarged cross-sectional view of section A of the secondary battery shown in FIG. 1.

FIG. 1 is a cross-sectional view schematically showing an example of a secondary battery according to the first embodiment. FIG. 2 is an enlarged cross-sectional view of section A of the secondary battery shown in FIG. 1.

The secondary battery 100 shown in FIGS. 1 and 2 includes a bag-shaped container member 2 shown in FIG. 1, an electrode group 1 shown in FIGS. 1 and 2, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 1, the electrode group 1 is a wound electrode group in a flat form. The wound electrode group 1 in a flat form includes a negative electrode 3, a separator 4, and a positive electrode 5, as shown in FIG. 2. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 2. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 1, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 3:
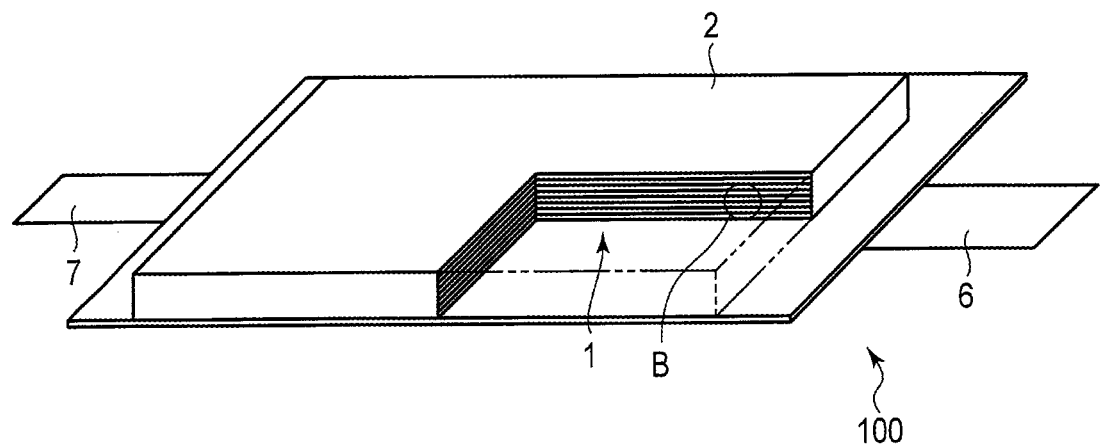
FIG. 3 is a partially cut-out perspective view schematically showing another example of the secondary battery according to the embodiment.
Figure 4:
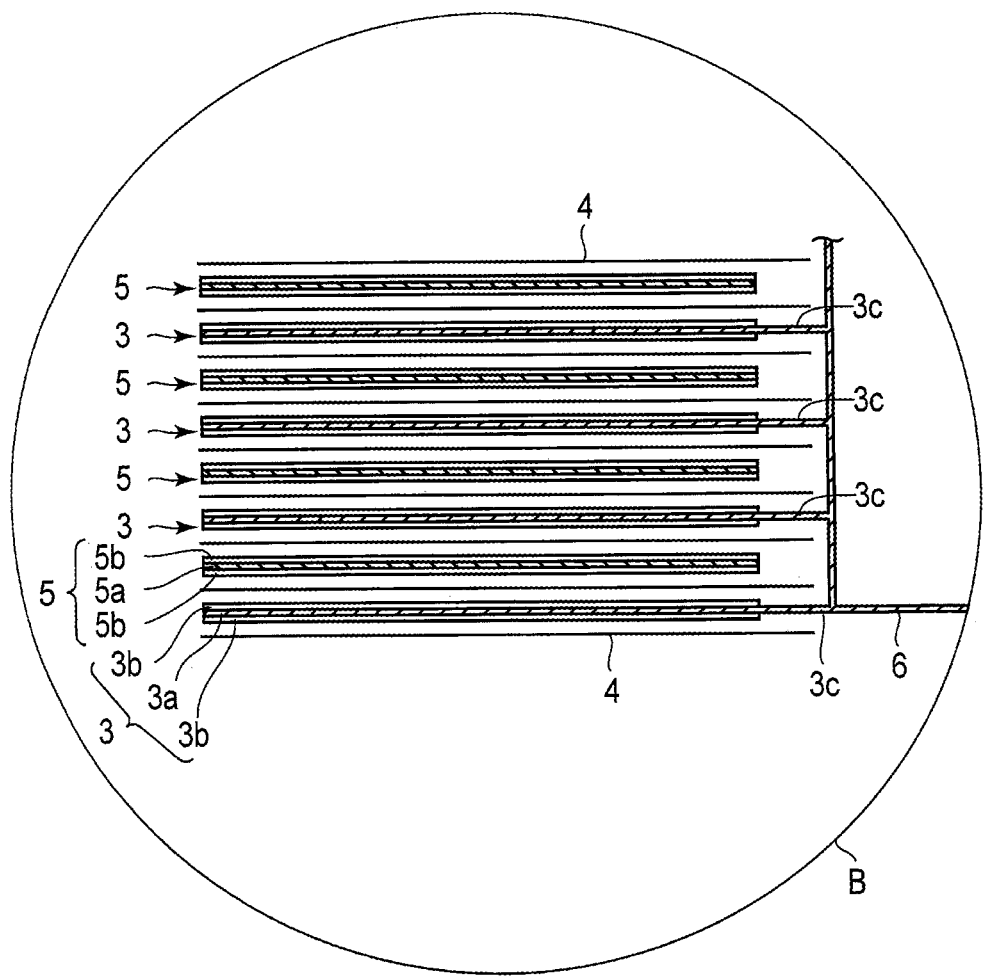
FIG. 4 is an enlarged cross-sectional view of section B of the secondary battery shown in FIG. 3.

The secondary battery according to the first embodiment is not limited to the secondary battery of the structure shown in FIGS. 1 and 2, and may be, for example, a battery of a structure shown in FIGS. 3 and 4.

FIG. 3 is a partially cutout perspective view schematically showing another example of the secondary battery according to the first embodiment. FIG. 4 is an enlarged cross-sectional view of section B of the secondary battery shown in FIG. 3.

The secondary battery 100 shown in FIGS. 3 and 4 includes an electrode group 1 shown in FIGS. 3 and 4, a container member 2 shown in FIG. 3, and an electrolyte, which is not shown. The electrode group 1 and electrolyte are housed in the container member 2. The electrolyte is held in the electrode group 1.

The container member 2 is made of a laminate film including two resin layers and a metal layer sandwiched between the resin layers.

As shown in FIG. 4, the electrode group 1 is a stacked electrode group. The stacked electrode group 1 has a structure in which negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 4, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the first embodiment includes a positive electrode, a negative electrode including a niobium-titanium composite oxide, and an electrolyte. The niobium-titanium composite oxide has fluorine atoms on at least part of a surface thereof. An abundance ratio $A_F$ of fluorine atoms, an abundance ratio $A_{Ti}$ of titanium atoms, and an abundance ratio $A_{Nb}$ of niobium atoms on a surface of the negative electrode according to X-ray photoelectron spectroscopy satisfy a relationship of $3.5 \leq A_F/(A_{Ti}+A_{Nb}) \leq 50$. A battery having the above configuration exhibits excellent life performance during use of high output.

Second Embodiment

According to a second embodiment, a battery module is provided. The battery module according to the second embodiment includes plural of secondary batteries according to the first embodiment.

In the battery module according to the second embodiment, each of the single-batteries may be arranged to be electrically connected in series or in parallel, or may be arranged in combination of in-series connection and in-parallel connection.

An example of the battery module according to the second embodiment will be described next, with reference to the drawings.

Figure 5:
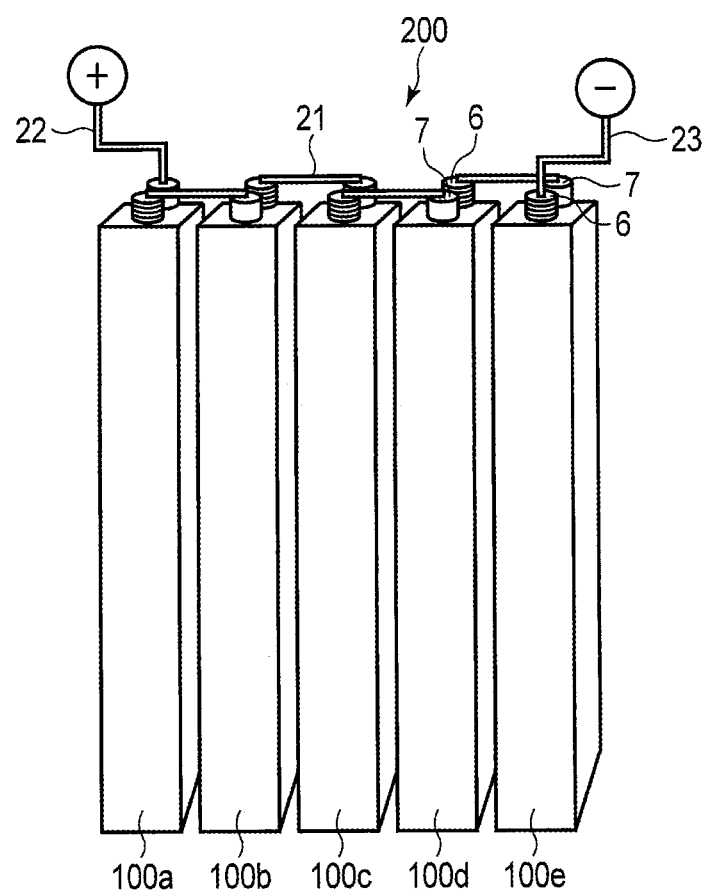
FIG. 5 is a perspective view schematically showing an example of a battery module according to an embodiment.

FIG. 5 is a perspective view schematically showing an example of the battery module according to the second embodiment. The battery module 200 shown in FIG. 5 includes five single-batteries 100a to 100e, four bus bars 21, a positive electrode-side lead 22, and a negative electrode-side lead 23. Each of the five single-batteries 100a to 100e is the secondary battery according to the first embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 5 is a battery module of five-in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 7 of at least one battery among the five single-batteries 100a to 100e is electrically connected to the positive electrode-side lead 22 for external connection. In addition, the negative electrode terminal 6 of at least one battery among the five single-batteries 100a to 100e is electrically connected to the negative electrode-side lead 23 for external connection.

The battery module according to the second embodiment includes the secondary battery according to the first embodiment. Therefore, the battery module exhibits excellent life performance during use of high output.

Third Embodiment

According to a third embodiment, a battery pack is provided. The battery pack includes a battery module according to the second embodiment. The battery pack may include a single secondary battery according to the first embodiment, in place of the battery module according to the second embodiment.

The battery pack according to the third embodiment may further include a protective circuit. The protective circuit has a function to control charging and discharging of the secondary battery. Alternatively, a circuit included in equipment where the battery pack serves as a power source (for example, electronic devices, automobiles, and the like) may be used as the protective circuit for the battery pack.

Moreover, the battery pack according to the third embodiment may further include an external power distribution terminal. The external power distribution terminal is configured to externally output current from the secondary battery, and/or to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the third embodiment will be described with reference to the drawings.

Figure 6:
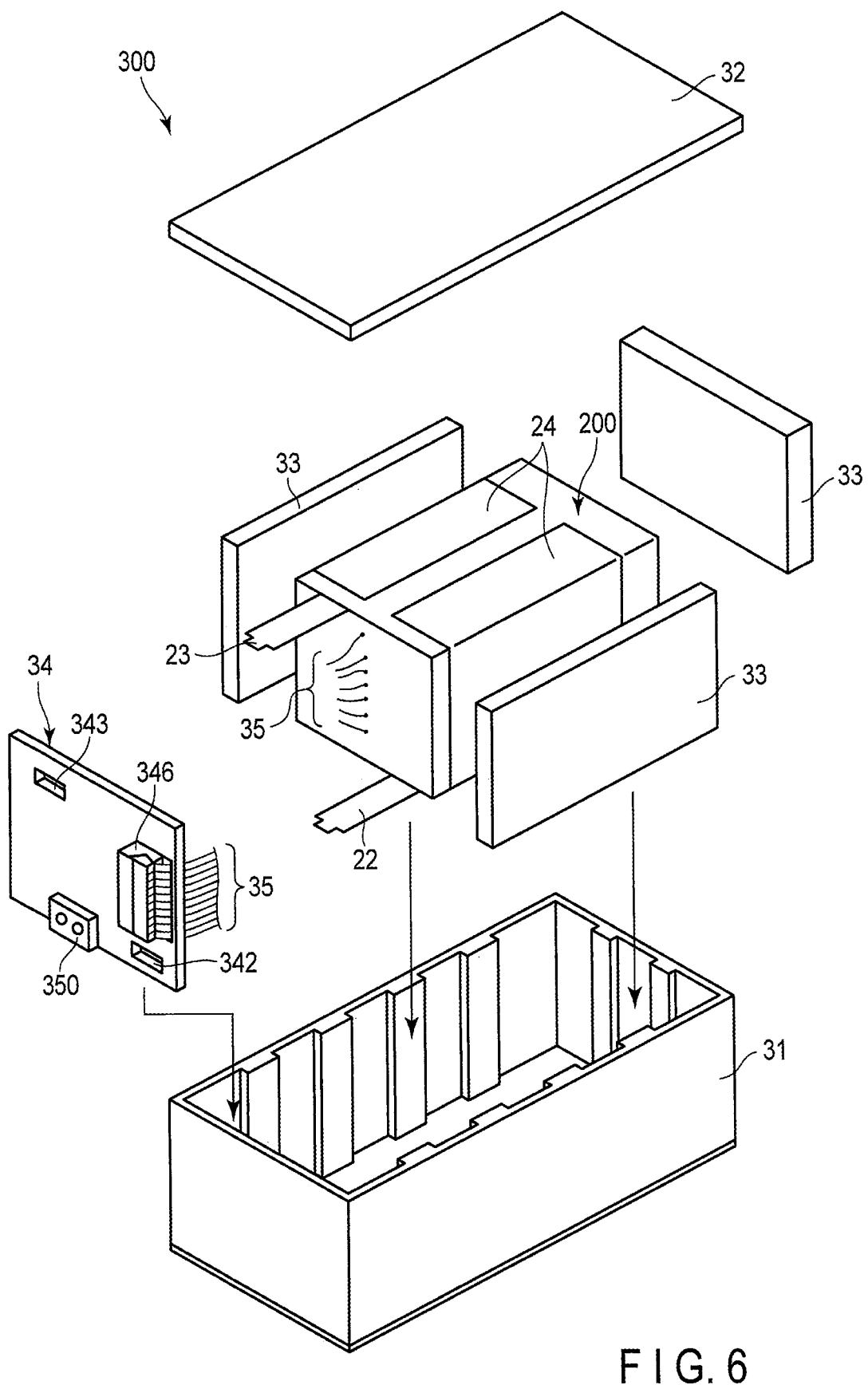
FIG. 6 is an exploded perspective view schematically showing an example of a battery pack according to an embodiment.
Figure 7:
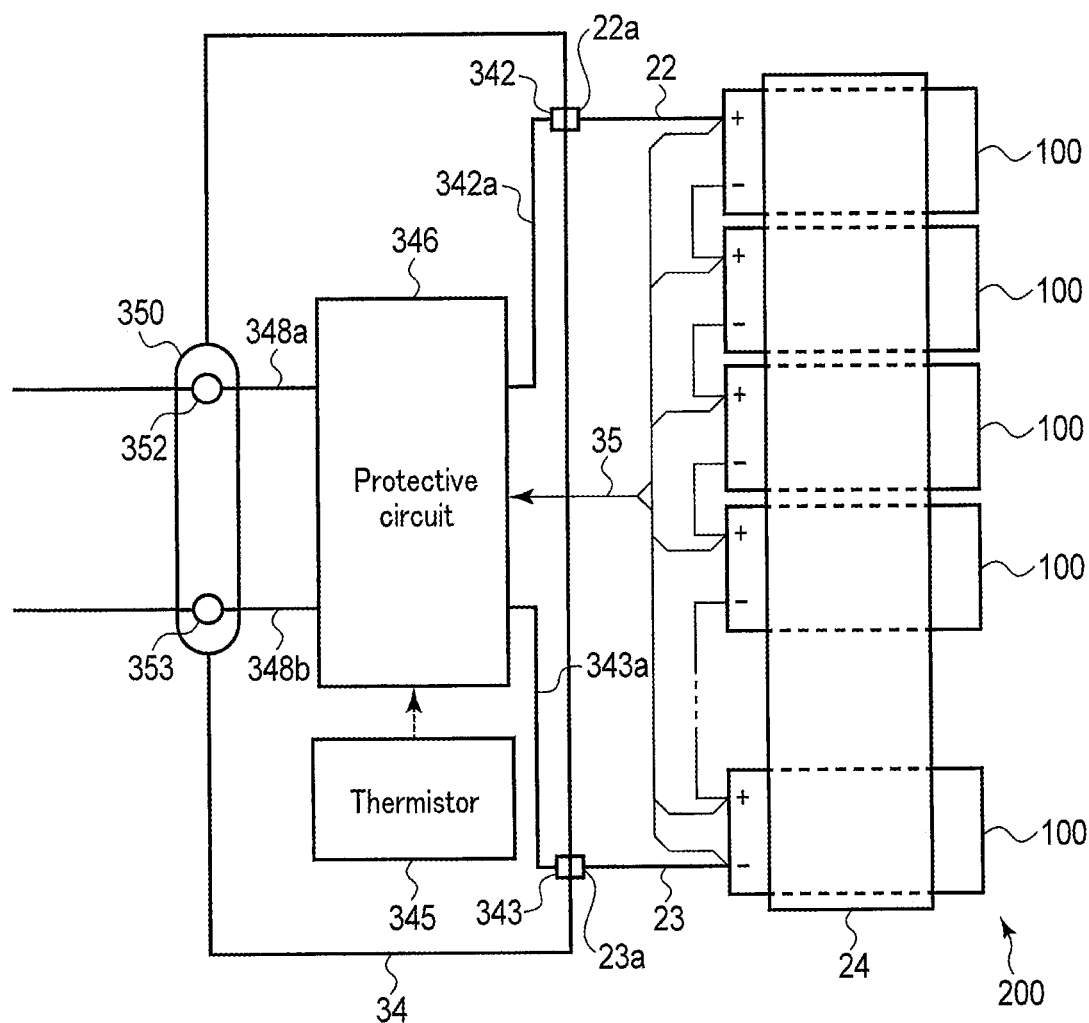
FIG. 7 is a block diagram showing an example of an electric circuit of the battery pack shown in FIG. 6.

FIG. 6 is an exploded perspective view schematically showing an example of the battery pack according to the third embodiment. FIG. 7 is a block diagram showing an example of an electric circuit of the battery pack shown in FIG. 6.

A battery pack 300 shown in FIGS. 6 and 7 includes a housing container 31, a lid 32, protective sheets 33, a battery module 200, a printed wiring board 34, wires 35, and an insulating plate (not shown).

The housing container 31 shown in FIG. 6 is a square bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a secondary battery according to the first embodiment. The plural single-batteries 100 are electrically connected in series, as shown in FIG. 7. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode(s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side wiring (positive-side wiring) 348a, and a minus-side wiring (negative-side wiring) 348b. One principal surface of the printed wiring board 34 faces one side surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cutoff electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of overcharge, over-discharge, and overcurrent of the single-battery(s) 100. When detecting over charge or the like for each of the single batteries 100, the battery voltage may be detected, or a positive electrode potential or negative electrode potential may be detected. In the latter case, a lithium electrode to be used as a reference electrode is inserted into each single battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of the vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal and negative-side terminal of the external power distribution terminal.

Such a battery pack is used, for example, in applications where excellent cycle performance is demanded when a large current is extracted. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the third embodiment is provided with the secondary battery according to the first embodiment or the battery module according to the second embodiment. Accordingly, the battery pack exhibits excellent life performance during use of high output.

Fourth Embodiment

According to a fourth embodiment, a vehicle is provided. The battery pack according to the third embodiment is installed on this vehicle.

In the vehicle according to the fourth embodiment, the battery pack is configured, for example, to recover regenerative energy from motive force of the vehicle. The vehicle may include a mechanism (e.g., a regenerator) configured to convert kinetic energy of the vehicle into regenerative energy.

Examples of the vehicle according to the fourth embodiment include two-wheeled to four-wheeled hybrid electric automobiles, two-wheeled to four-wheeled electric automobiles, electrically assisted bicycles, and railway cars.

In the vehicle according to the fourth embodiment, the installing position of the battery pack is not particularly limited. For example, when installing the battery pack on an automobile, the battery pack may be installed in the engine compartment of the automobile, in rear parts of the vehicle body, or under seats.

The vehicle according to the fourth embodiment may have plural battery packs installed. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

An example of the vehicle according to the fourth embodiment is explained below, with reference to the drawings.

Figure 8:
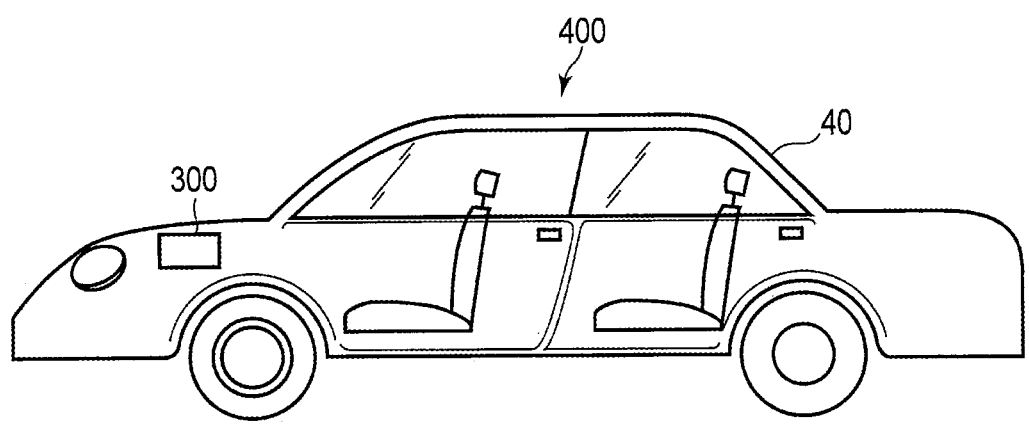
FIG. 8 is a partially see-through diagram schematically showing an example of a vehicle according to an embodiment.

FIG. 8 is a partially see-through diagram schematically showing an example of a vehicle according to the fourth embodiment.

A vehicle 400, shown in FIG. 8 includes a vehicle body 40 and a battery pack 300 according to the third embodiment. In the example shown in FIG. 8, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 8, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Figure 9:
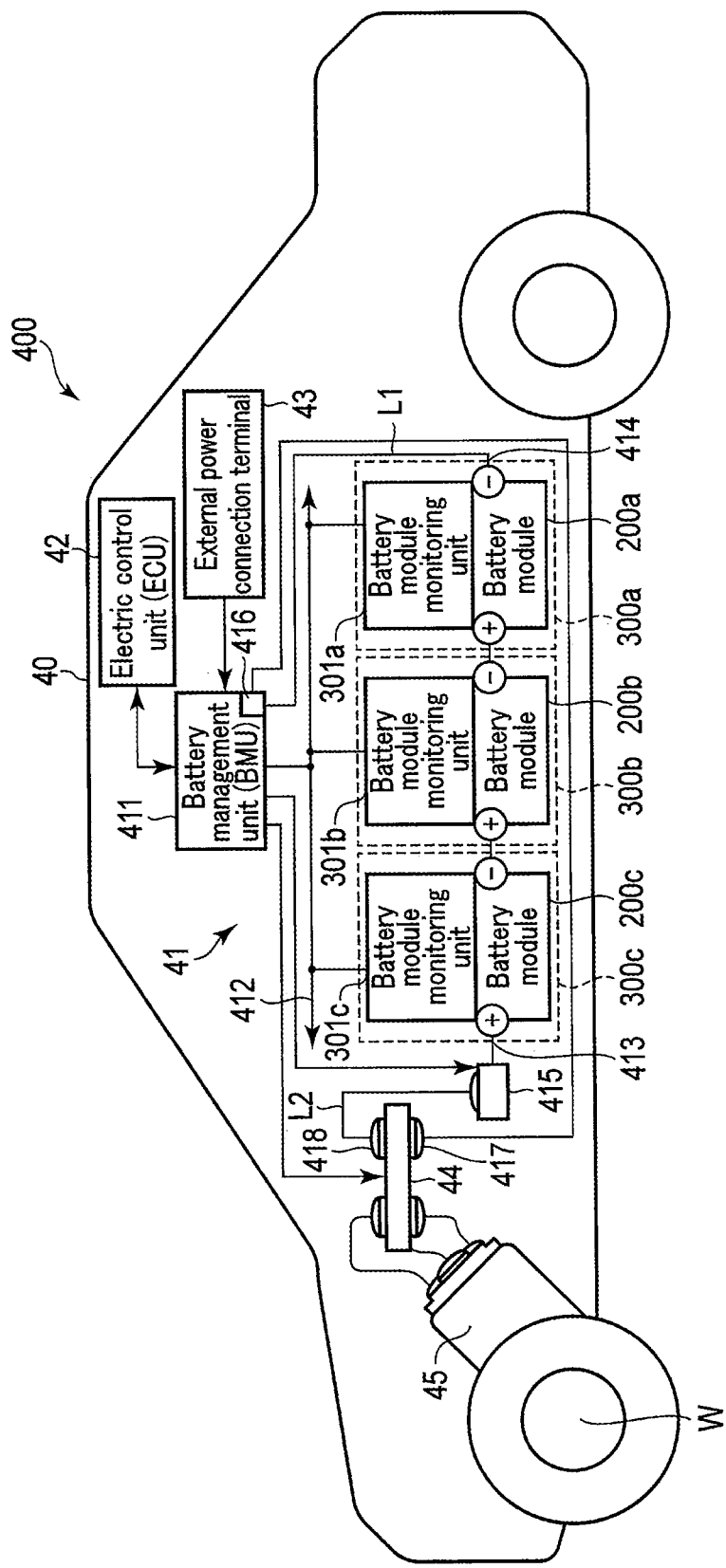
FIG. 9 is a diagram schematically showing an example of a control system related to an electric system in the vehicle according to the embodiment.

Next, with reference to FIG. 9, an aspect of operation of the vehicle according to the fourth embodiment is explained.

FIG. 9 is a diagram schematically showing an example of a control system related to an electric system in the vehicle according to the fourth embodiment. A vehicle 400, shown in FIG. 9, is an electric automobile.

The vehicle 400, shown in FIG. 9, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 9, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit 301a (e.g., a VTM: voltage temperature monitoring). The battery pack 300b includes a battery module 200b and a battery module monitoring unit 301b. The battery pack 300c includes a battery module 200c and a battery module monitoring unit 301c. The battery packs 300a to 300c are battery packs similar to the aforementioned battery pack 300, and the battery modules 200a to 200c are battery modules similar to the aforementioned battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the first embodiment. The battery modules 200a to 200c each perform charging and discharging via a positive electrode terminal 413 and a negative electrode terminal 414.

The battery management unit 411 performs communication with the battery module monitoring units 301a to 301c and collects information such as voltages or temperatures for each of the single-batteries 100 included in the battery modules 200a to 200c included in the vehicle power source 41. In this manner, the battery management unit 411 collects information concerning security of the vehicle power source 41.

The battery management unit 411 and the battery module monitoring units 301a to 301c are connected via the communication bus 412. In the communication bus 412, a set of communication lines is shared at multiple nodes (i.e., the battery management unit 411 and one or more battery module monitoring units 301a to 301c). The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 9) for switching on and off electrical connection between the positive electrode terminal 413 and the negative electrode terminal 414. The switch unit 415 includes a precharge switch (not shown), which is turned on when the battery modules 200a to 200c are charged, and a main switch (not shown), which is turned on when output from the battery modules 200a to 200c is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism (a regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line L1 is connected to the negative electrode terminal 414 of the vehicle power source 41. The other terminal of the connecting line Li is connected to a negative electrode input terminal 417 of the inverter 44. A current detector (current detecting circuit) 416 in the battery management unit 411 is provided on the connecting line Li in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44. The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the fourth embodiment is installed with the battery pack according to the third embodiment. Thus, by virtue of the battery pack being capable of exhibiting excellent life performance during use of high output, the vehicle exhibits high performance and also has high reliability.

EXAMPLES

Examples will be described hereinafter, but the embodiments of the present invention are not limited to the examples listed below, so long as the embodiments do not depart from the spirit of the invention.

Example 1

[Production of Positive Electrode]

As positive electrode active material, prepared was a powder of lithium nickel cobalt manganese composite oxide having a composition represented by $LiNi_{0.34}Co_{0.33}Mn_{0.33}O_2$.

The lithium nickel cobalt manganese composite oxide powder, acetylene black as electro-conductive agent and polyvinylidene fluoride (PVdF) as binder were added at a mixing ratio of 95 parts by mass:3 parts by mass:2 parts by mass into N-methylpyrrolidone (NMP) as a solvent, and mixed. Next, the resulting mixture was dispersed using a planetary centrifugal mixer to prepare a slurry.

Next, the prepared slurry was applied onto both surfaces of a current collector made of aluminum foil having a thickness of 15 μm. An amount of application per side of the current collector was 100 g/m². Next, the applied coat was dried and pressed, thereby producing a positive electrode including a positive electrode active material-containing layer with a density of 3.2 g/cm³.

[Production of Negative Electrode]

A niobium-titanium composite oxide having a composition represented by $TiNb_2O_7$ was prepared as an active material. Acetylene black (AB) was prepared as an electro-conductive agent, and carboxymethyl cellulose (CMC) and styrene-butadiene rubber (SBR) were prepared as binder. The $TiNb_2O_7$, AB, CMC, and SBR were added at a mixing ratio of 95 parts by mass:2 parts by mass:1.5 parts by mass:1.5 parts by mass into pure water as solvent, and mixed. Next, the resulting mixture was dispersed using a planetary centrifugal mixer to yield a slurry.

Next, the prepared slurry was applied onto both of reverse faces of a current collector made of aluminum foil having a thickness of 15 μm. An amount of application was 80 g/m² per face of the current collector. Then, the applied coat was dried, and pressing was performed, thereby producing a negative electrode provided with a negative electrode active material-containing layer having a density of 2.6 g/cm³.

[Production of Electrode Group]

A separator made of polyethylene porous film having a thickness of 15 μm was prepared. Next, plural positive electrode pieces were punched out from the above positive electrode, each having dimensions of 50 mm vertical and 50 mm horizontal. In a similar manner, plural negative electrode pieces were punched out from the above negative electrode, each having dimensions of 50 mm vertical and 50 mm horizontal. The thus prepared plural positive electrode pieces, plural negative electrode pieces, and separator were stacked in such a manner that the separator was folded in zigzag, and these components were arranged in an order where the separator is placed on a negative electrode piece, a positive electrode piece is placed thereon, and the separator is placed further on top. Thereby, an electrode stack was obtained. Subsequently, the electrode stack was heat-pressed at 80° C.

Accordingly, a flat electrode group having a width of 50 mm, a height of 50 mm, and a thickness of 1.4 mm was produced.

The current collectors of each of the positive electrode pieces included in the obtained electrode group were electrically connected, and a positive electrode terminal made of aluminum was welded thereto. The current collectors of each of the negative electrode pieces included in the obtained electrode group were electrically connected, and a negative electrode terminal made of aluminum was welded thereto.

[Housing and Drying of Electrode Group]

A container member made of laminate film was prepared. The laminate film was provided with an aluminum foil having a thickness of 40 μm and a polypropylene layer formed on both surfaces of the aluminum foil. A total thickness of the laminate film was 0.1 mm.

Next, the electrode group was housed in the container member with a part of the positive electrode terminal and a part of the negative electrode terminal placed outside. Next, the periphery of the container was heat-sealed, leaving a part unsealed. In this state, the electrode group was subjected to vacuum drying at 80° C. for 24 hours.

[Preparation of Nonaqueous Electrolyte]

Propylene carbonate (PC), methyl ethyl carbonate (MEC), and ethyl propionate (EP) were mixed at a mass ratio of 30:60:10 to obtain a mixed solvent. $LiPF_6$ as an electrolyte salt was dissolved in this mixed solvent at a concentration of 1 M. Tristrimethylsilylphosphate (TMSP) was further added thereto, such that an amount thereof would be 1% by mass, and thus, a liquid nonaqueous electrolyte was prepared.

[Assembly of Preliminary Battery]

The liquid nonaqueous electrolyte was put into the container housing the electrode group as described above. Then, a temporary seal was placed on the part of the periphery of the container that had not been heat-sealed, and the electrode group and the nonaqueous electrolyte were sealed within the container member.

[Pulse Charging Treatment]

The assembled preliminary battery was placed into a thermostatic bath set to a bath temperature of 25° C. In the thermostatic bath, the preliminary battery was charged at a constant current of 0.2 C up to a battery voltage of 2.85 V, and after reaching the battery voltage of 2.85 V, charged at a constant voltage. Charging was completed when the current value reached 0.05 C. After maintaining the battery in a resting state for 20 minutes, the preliminary battery was discharged at a constant current of 0.2 C to a battery voltage of 1.5 V. The discharge capacity confirmed at the time of this discharge was 0.5 Ah.

Thereafter, the preliminary battery was charged at a constant current of 1 C up to SOC 80% relative to the confirmed capacity. After maintaining the preliminary battery in a resting state for 10 minutes, the preliminary battery was charged for a short period of time at a large current, thereby forming a coating-film on the negative electrode. Specifically, pulse charging was performed under the following conditions.

Charging was performed for 10 seconds at 10 C current, and the preliminary battery was maintained in a resting state for 30 seconds. The combination of charging pulse and subsequent resting time was applied three times in total, thereby forming a coating-film on the negative electrode.

Thereafter, the battery was discharged at a constant current of 0.2 C to a battery voltage of 1.5 V. In order to reexamine the capacity, the battery was charged at a constant current of 0.2 C up to a battery voltage of 2.85 V, and after reaching battery a voltage of 2.85 V, charged at a constant voltage. Charging was completed when the current value reached 0.05 C. After maintaining the battery in a resting state for 20 minutes, the battery was discharged at a constant current of 0.2 C to a battery voltage of 1.5 V. The discharge capacity confirmed for the obtained nonaqueous electrolyte battery was 0.5 Ah.

Example 2

A nonaqueous electrolyte battery was manufactured in a similar manner as in Example 1 except that lithium nickel cobalt manganese composite oxide having a composition represented by $LiNi_{0.5}Co_{0.2}Mn_{0.3}O_2$ was used instead, as positive electrode active material.

Example 3

A nonaqueous electrolyte battery was manufactured in a similar manner as in Example 1 except that lithium nickel cobalt manganese composite oxide having a composition represented by $LiNi_{0.6}Co_{0.2}Mn_{0.2}O_2$ was used instead, as positive electrode active material.

Example 4

A nonaqueous electrolyte battery was manufactured in a similar manner as in Example 1 except that lithium nickel cobalt manganese composite oxide having a composition represented by $LiNi_{0.8}Co_{0.1}Mn_{0.1}O_2$ was used instead as positive electrode active material, and the method of capacity examination when performing the pulse charging treatment were changed as follows.

The assembled preliminary battery was placed into a thermostatic bath set to a bath temperature of 25° C. In the thermostatic bath, the preliminary battery was charged at a constant current of 0.2 C up to a battery voltage of 2.8 V, and after reaching the battery voltage of 2.8 V, charged at a constant voltage. Charging was completed when the current value reached 0.05 C. After the preliminary battery was maintained at resting state for 20 minutes, the preliminary battery was discharged at a constant current of 0.2 C to a battery voltage of 1.5 V. The discharge capacity confirmed upon this discharge was 0.5 Ah.

Thereafter, pulse charging was performed under the same conditions as that for Example 1, to perform the coating-film formation onto the negative electrode.

After that, constant current discharge was performed at 0.2 C to a battery voltage of 1.5 V. In order to reexamine the capacity, constant current charging was performed at 0.2 C current up to a battery voltage of 2.8 V, and constant voltage charging was performed after reaching battery a voltage of 2.8 V. Charging was completed when the current value reached 0.05 C. After maintaining the battery in a resting state for 20 minutes, the battery was discharged at a constant current of 0.2 C to a battery voltage of 1.5 V. The discharge capacity confirmed for the obtained nonaqueous electrolyte battery was 0.5 Ah.

Example 5

A nonaqueous electrolyte battery was manufactured in a similar manner as in Example 1 except that diisocyanate-hexane (DICNH) was added instead of TMSP to the nonaqueous electrolyte.

Example 6

A nonaqueous electrolyte battery was manufactured in a similar manner as in Example 1 except that succinonitrile (SN) was added instead of TMSP to the nonaqueous electrolyte.

Example 7

A nonaqueous electrolyte battery was manufactured in a similar manner as in Example 1 except that propane sultone (PS) was added instead of TMSP to the nonaqueous electrolyte.

Example 8

A nonaqueous electrolyte battery was manufactured in a similar manner as in Example 1 except that the conditions of pulse charging were changed as follows.

After the discharge capacity was confirmed in a manner similar to that for Example 1, the battery was charged at a constant current of 1 C up to SOC 60% relative to the confirmed capacity. The preliminary battery was moved into a thermostatic bath set to 20° C., and left for 1 hour. Thereafter, short period charging was carried out at a large current to thereby form a coating-film on the negative electrode. Specifically, pulse charging was performed under the following conditions.

Charging was performed for 30 seconds at 5 C current, and a resting state was maintained for 30 seconds. The combination of charging pulse and subsequent resting time were performed a total of two times, thereby performing a coating-film formation onto the negative electrode.

Thereafter, the capacity was reexamined within a thermostatic bath set to 25° C., in a similar manner as that in Example 1. As a result, the discharge capacity confirmed for the obtained nonaqueous electrolyte battery was 0.5 Ah.

Example 9

A nonaqueous electrolyte battery was manufactured in a similar manner as in Example 1 except that the conditions of pulse charging were changed as follows.

After the discharge capacity was examined in a manner similar to that for Example 1, the battery was charged at a constant current of 1 C up to SOC 70% relative to the confirmed capacity. The preliminary battery was moved into a thermostatic bath set to 45° C., and left for 1 hour. Thereafter, short period charging was carried out at a large current to thereby form a coating-film on the negative electrode. Specifically, pulse charging was performed under the following conditions.

Charging was performed for 10 seconds at 10 C current, and a resting state was maintained for 30 seconds. The combination of charging pulse and subsequent resting time was applied three times in total, thereby forming a coating-film on the negative electrode.

Thereafter, the capacity was reexamined within a thermostatic bath set to 25° C., in a similar manner as that in Example 1. As a result, the discharge capacity confirmed for the obtained nonaqueous electrolyte battery was 0.5 Ah.

Example 10

A nonaqueous electrolyte battery was manufactured in a similar manner as in Example 1 except that as the electrolyte salt of the liquid nonaqueous electrolyte, $LiBF_4$ was dissolved at a concentration of 1 M, instead of $LiPF_6$.

Example 11

A nonaqueous electrolyte battery was manufactured in a similar manner as in Example 1 except that TMSP was not added to the liquid nonaqueous electrolyte.

Example 12

A nonaqueous electrolyte battery was manufactured in a similar manner as in Example 1 except that, as solvent of the liquid nonaqueous electrolyte, a mixed solvent of propylene carbonate (PC) and methyl ethyl carbonate (MEC) mixed at a mass ratio of 30:70 was used.

Example 13

A nonaqueous electrolyte battery was manufactured in a similar manner as in Example 12 except that as the electrolyte salt of the liquid nonaqueous electrolyte, $LiBF_4$ was dissolved at a concentration of 1 M, instead of $LiPF_6$.

Example 14

A nonaqueous electrolyte battery was manufactured in a similar manner as in Example 12 except that as the electrolyte salt of the liquid nonaqueous electrolyte, bisfluorosulfonylimide (LiFSI) was dissolved at a concentration of 1 M, instead of $LiPF_6$.

Example 15

When producing the negative electrode, a niobium-titanium composite oxide $TiNb_2O_7$ as active material, AB as electro-conductive agent, and PVdF as binder were prepared. The $TiNb_2O_7$, AB, and PVdF were added at a mixing ratio of 95 parts by mass:3 parts by mass:2 parts by mass into NMP as solvent, and mixed. Except that the obtained resulting slurry was used instead to produce the negative electrode, a nonaqueous electrolyte battery was manufactured in a manner similar to that in Example 1.

Example 16

A nonaqueous electrolyte battery was manufactured in a similar manner as in Example 1 except that the amount of application per face of the current collector of the positive electrode was changed to 75 g/m², the amount of application per face of the current collector of the negative electrode was changed to 60 g/m², and the stacking numbers of the positive electrode pieces, negative electrode pieces and separators were changed so that the electrode group had a thickness of 1.6 mm.

Example 17

A nonaqueous electrolyte battery was manufactured in a similar manner as in Example 1 except that the amount of application onto the current collector of the positive electrode was changed to 50 g/m² per face, the amount of application onto the current collector of the negative electrode was changed to 40 g/m per facet, and the stacking numbers of the positive electrode pieces, negative electrode pieces and separators were changed so that the electrode group had a thickness of 1.8 mm.

Example 18

A positive electrode was produced in a similar manner as in Example 1 except that the amount of application onto the current collector of the positive electrode was changed to 50 g/m² per face.

When producing the negative electrode, a niobium-titanium composite oxide having a composition represented by $Li_{2.05}Na_{1.7}Ti_{5.7}Nb_{0.3}O_{14}$, AB, and PVdF were prepared. The $Li_{2.05}Na_{1.7}Ti_{5.7}Nb_{0.3}O_{3.4}$, AB, and PVdF were added at a mixing ratio of 95 parts by mass:3 parts by mass:2 parts by mass into NMP as solvent, and mixed. Subsequently, the resulting mixture was dispersed using a planetary centrifugal mixer to yield a slurry. Next, the prepared slurry was applied onto both of reverse faces of a current collector made of aluminum foil having a thickness of 15 μm. An amount of application was 80 g/m² per face of the current collector. Then, the applied coat was dried, and pressing was performed, thereby producing a negative electrode provided with a negative electrode active material-containing layer having a density of 2.5 g/cm².

A nonaqueous electrolyte battery was manufactured in a similar manner as in Example 1 except that positive electrode pieces and negative electrode pieces respectively punched out from the obtained positive electrode and negative electrode were used instead, and the stacking numbers of the positive electrode pieces, negative electrode pieces and separators were changed so that the electrode group had a thickness of 2.3 mm.

Comparative Example 1

A nonaqueous electrolyte battery was manufactured in a similar manner as in Example 1 except that pulse charging was not performed after the discharge capacity was confirmed in a manner similar to Example 1. Reexamination of the discharge capacity after the pulse charging was also omitted.

Comparative Example 2

A nonaqueous electrolyte battery was manufactured in a similar manner as in Example 1 except that the conditions of pulse charging were changed as follows.

After the discharge capacity was confirmed in a manner similar to that for Example 1, the battery was moved into a thermostatic bath set to 60° C., and left for 1 hour. Charging was performed at a constant current of 1 C up to SOC 100% relative to the confirmed capacity. After maintaining the resting state or 10 minutes, short period charging was carried out at a large current to thereby form a coating-film on the negative electrode. Specifically, pulse charging was performed under the following conditions.

Charging was performed for 10 seconds at 10 C current, and a resting state was maintained for 30 seconds. The combination of charging pulse and subsequent resting time was applied three times in total, thereby forming a coating-film on the negative electrode.

Thereafter, the capacity was reexamined within a thermostatic bath set to 25° C., in a similar manner as that in Example 1. As a result, the discharge capacity confirmed for the obtained nonaqueous electrolyte battery was 0.5 Ah.

Comparative Example 3

A nonaqueous electrolyte battery was manufactured in a similar manner as in Example 1 except that the conditions of pulse charging were changed as follows.

After the discharge capacity was confirmed in a manner similar to that for Example 1, the battery was moved into a thermostatic bath set to 0° C., and left for 1 hour. Charging was performed at a constant current of 1 Cup to SOC 80% relative to the confirmed capacity. After maintaining the resting state or 10 minutes, short period charging was carried out at a large current to thereby form a coating-film on the negative electrode. Specifically, pulse charging was performed under the following conditions.

Charging was performed for 10 seconds at 10 C current, and a resting state was maintained for 30 seconds. The combination of charging pulse and subsequent resting time was applied three times in total, thereby forming a coating-film on the negative electrode.

Thereafter, the capacity was reexamined within a thermostatic bath set to 25° C., in a similar manner as that in Example 1. As a result, the discharge capacity confirmed for the obtained nonaqueous electrolyte battery was 0.5 Ah.

<Measurement>

For each nonaqueous electrolyte battery obtained in Examples 1 to 18 and Comparative Examples 1 to 3, X-ray photoelectron spectroscopy (XPS) measurement was performed upon the negative electrode surface by the method described above. The results of the measurement are shown in Table 3 below.

Tables 1 to 3 below summarize the preparation condition of each nonaqueous electrolyte battery in Examples 1 to 18 and Comparative Examples 1 to 3, and the results of XPS measurements. Specifically, Table 1 shows the details of the positive electrode and the negative electrode, Table 2 shows the details of the nonaqueous electrolyte, and Table 3 shows the conditions of the pulse charging treatment for forming a coating-film on the negative electrode and the XPS measurement results. Table 1 shows the composition of the active material used for the positive electrode, the amount per face of the positive electrode material slurry applied onto the current collector, the composition of the active material used for the negative electrode, the composition of the binder used for the negative electrode, and the amount per face of the negative electrode slurry applied onto the current collector. Table 2 shows the composition of the solvent used for the nonaqueous electrolyte, the specie and concentration of the electrolyte salt, and the specie and concentration of other additives. Table 3 shows the environmental temperature in the pulse charging treatment, the state of charge (SOC) of the preliminary battery immediately before the pulse charging treatment, the duration of pulse charging, the number of times for performing pulse charging, and the resting time provided for every pulse charging. Table 3 further shows, as the XPS measurement results, the ratio $A_F/(A_{Ti}+A_{Nb})$ of the abundance ratio $(A_F)$ of fluorine atoms to the sum of the abundance ratio $(A_{Ti})$ of titanium atoms and the abundance ratio $(A_{Nb})$ of niobium atoms confirmed on the negative electrode surface, the ratio $A_{Li}/A_F$ of the abundance ratio $(A_{Li})$ of lithium atoms to the abundance ratio $(A_F)$ of fluorine atoms confirmed on the negative electrode surface, and the presence of Ni atoms, S atoms, or Si atoms confirmed on the negative electrode surface.

TABLE 1

| | Positive Electrode | | Negative Electrode | | |
|---|---|---|---|---|---|
| | Active Material Composition | Application Amount of Slurry | Active Material Composition | Binder [Mass Ratio] | Application Amount of Slurry |
| Example 1 | $LiNi_{0.34}Co_{0.33}Mn_{0.33}O_2$ | 100 g/m² | $TiNb_2O_7$ | CMC:SBR [1:1] | 80 g/m² |

TABLE 1-continued

| | Positive Electrode | | Negative Electrode | | |
|---|---|---|---|---|---|
| | Active Material Composition | Application Amount of Slurry | Active Material Composition | Binder [Mass Ratio] | Application Amount of Slurry |
| Example 2 | $LiNi_{0.5}Co_{0.2}Mn_{0.3}O_2$ | 100 g/m² | $TiNb_2O_7$ | CMC:SBR [1:1] | 80 g/m² |
| Example 3 | $LiNi_{0.6}Co_{0.2}Mn_{0.2}O_2$ | 100 g/m² | $TiNb_2O_7$ | CMC:SBR [1:1] | 80 g/m² |
| Example 4 | $LiNi_{0.8}Co_{0.1}Mn_{0.1}O_2$ | 100 g/m² | $TiNb_2O_7$ | CMC:SBR [1:1] | 80 g/m² |
| Example 5 | $LiNi_{0.34}Co_{0.33}Mn_{0.33}O_2$ | 100 g/m² | $TiNb_2O_7$ | CMC:SBR [1:1] | 80 g/m² |
| Example 6 | $LiNi_{0.34}Co_{0.33}Mn_{0.33}O_2$ | 100 g/m² | $TiNb_2O_7$ | CMC:SBR [1:1] | 80 g/m² |
| Example 7 | $LiNi_{0.34}Co_{0.33}Mn_{0.33}O_2$ | 100 g/m² | $TiNb_2O_7$ | CMC:SBR [1:1] | 80 g/m² |
| Example 8 | $LiNi_{0.34}Co_{0.33}Mn_{0.33}O_2$ | 100 g/m² | $TiNb_2O_7$ | CMC:SBR [1:1] | 80 g/m² |
| Example 9 | $LiNi_{0.34}Co_{0.33}Mn_{0.33}O_2$ | 100 g/m² | $TiNb_2O_7$ | CMC:SBR [1:1] | 80 g/m² |
| Example 10 | $LiNi_{0.34}Co_{0.33}Mn_{0.33}O_2$ | 100 g/m² | $TiNb_2O_7$ | CMC:SBR [1:1] | 80 g/m² |
| Example 11 | $LiNi_{0.34}Co_{0.33}Mn_{0.33}O_2$ | 100 g/m² | $TiNb_2O_7$ | CMC:SBR [1:1] | 80 g/m² |
| Example 12 | $LiNi_{0.34}Co_{0.33}Mn_{0.33}O_2$ | 100 g/m² | $TiNb_2O_7$ | CMC:SBR [1:1] | 80 g/m² |
| Example 13 | $LiNi_{0.34}Co_{0.33}Mn_{0.33}O_2$ | 100 g/m² | $TiNb_2O_7$ | CMC:SBR [1:1] | 80 g/m² |
| Example 14 | $LiNi_{0.34}Co_{0.33}Mn_{0.33}O_2$ | 100 g/m² | $TiNb_2O_7$ | CMC:SBR [1:1] | 80 g/m² |
| Example 15 | $LiNi_{0.34}Co_{0.33}Mn_{0.33}O_2$ | 100 g/m² | $TiNb_2O_7$ | PVdF | 80 g/m² |
| Example 16 | $LiNi_{0.34}Co_{0.33}Mn_{0.33}O_2$ | 75 g/m² | $TiNb_2O_7$ | CMC:SBR [1:1] | 60 g/m² |
| Example 17 | $LiNi_{0.34}Co_{0.33}Mn_{0.33}O_2$ | 50 g/m² | $TiNb_2O_7$ | CMC:SBR [1:1] | 40 g/m² |
| Example 18 | $LiNi_{0.34}Co_{0.33}Mn_{0.33}O_2$ | 50 g/m² | $Li_{2.05}Na_{1.7}Ti_{5.7}Nb_{0.3}O_{14}$ | CMC:SBR [1:1] | 80 g/m² |
| Comparative Example 1 | $LiNi_{0.34}Co_{0.33}Mn_{0.33}O_2$ | 100 g/m² | $TiNb_2O_7$ | CMC:SBR [1:1] | 80 g/m² |
| Comparative Example 2 | $LiNi_{0.34}Co_{0.33}Mn_{0.33}O_2$ | 100 g/m² | $TiNb_2O_7$ | CMC:SBR [1:1] | 80 g/m² |
| Comparative Example 3 | $LiNi_{0.34}Co_{0.33}Mn_{0.33}O_2$ | 100 g/m² | $TiNb_2O_7$ | CMC:SBR [1:1] | 80 g/m² |

TABLE 2

| | Nonaqueous Electrolyte | | |
|---|---|---|---|
| | Solvent [Mass Ratio] | Electrolyte Salt [Concentration] | Other Additives [Added Amount] |
| Example 1 | PC:MEC:EP [30:60:10] | $LiPF_6$ [1M] | TMSP [1% by mass] |
| Example 2 | PC:MEC:EP [30:60:10] | $LiPF_6$ [1M] | TMSP [1% by mass] |
| Example 3 | PC:MEC:EP [30:60:10] | $LiPF_6$ [1M] | TMSP [1% by mass] |
| Example 4 | PC:MEC:EP [30:60:10] | $LiPF_6$ [1M] | TMSP [1% by mass] |
| Example 5 | PC:MEC:EP [30:60:10] | $LiPF_6$ [1M] | DICNH [1% by mass] |
| Example 6 | PC:MEC:EP [30:60:10] | $LiPF_6$ [1M] | SN [1% by mass] |
| Example 7 | PC:MEC:EP [30:60:10] | $LiPF_6$ [1M] | PS [1% by mass] |
| Example 8 | PC:MEC:EP [30:60:10] | $LiPF_6$ [1M] | TMSP [1% by mass] |
| Example 9 | PC:MEC:EP [30:60:10] | $LiPF_6$ [1M] | TMSP [1% by mass] |
| Example 10 | PC:MEC:EP [30:60:10] | $LiBF_4$ [1M] | TMSP [1% by mass] |
| Example 11 | PC:MEC:EP [30:60:10] | $LiPF_6$ [1M] | (No additive) [0%] |
| Example 12 | PC:MEC [30:70] | $LiPF_6$ [1M] | TMSP [1% by mass] |
| Example 13 | PC:MEC [30:70] | $LiBF_4$ [1M] | TMSP [1% by mass] |
| Example 14 | PC:MEC [30:70] | LiFSI [1M] | TMSP [1% by mass] |
| Example 15 | PC:MEC:EP [30:60:10] | $LiPF_6$ [1M] | TMSP [1% by mass] |
| Example 16 | PC:MEC:EP [30:60:10] | $LiPF_6$ [1M] | TMSP [1% by mass] |
| Example 17 | PC:MEC:EP [30:60:10] | $LiPF_6$ [1M] | TMSP [1% by mass] |
| Example 18 | PC:MEC:EP [30:60:10] | $LiPF_6$ [1M] | TMSP [1% by mass] |
| Comparative Example 1 | PC:MEC:EP [30:60:10] | $LiPF_6$ [1M] | TMSP [1% by mass] |
| Comparative Example 2 | PC:MEC:EP [30:60:10] | $LiPF_6$ [1M] | TMSP [1% by mass] |
| Comparative Example 3 | PC:MEC:EP [30:60:10] | $LiPF_6$ [1M] | TMSP [1% by mass] |

TABLE 3

| | Pulse charging treatment | | | | | | XPS Measurement Results | | |
|---|---|---|---|---|---|---|---|---|---|
| | Temperature | SOC | Current Value | Pulse Duration | Number of Pulses | Resting Time Between Pulses | $A_F/(A_{Ti}+A_{Nb})$ | $A_{Li}/A_F$ | Presence of Ni, S, Si Atoms on Negative Electrode Surface |
| Example 1 | 25° C. | 80% | 10 C | 10 sec | 3 | 30 sec | 10.4 | 0.6 | Si confirmed |
| Example 2 | 25° C. | 80% | 10 C | 10 sec | 3 | 30 sec | 10.5 | 0.65 | Si confirmed |
| Example 3 | 25° C. | 25% | 10 C | 10 sec | 3 | 30 sec | 10.8 | 0.64 | Si confirmed |
| Example 4 | 25° C. | 25% | 10 C | 10 sec | 3 | 30 sec | 11.1 | 0.63 | Si confirmed |
| Example 5 | 25° C. | 25% | 10 C | 10 sec | 3 | 30 sec | 8.9 | 0.59 | N confirmed |
| Example 6 | 25° C. | 25% | 10 C | 10 sec | 3 | 30 sec | 9.2 | 0.58 | N confirmed |
| Example 7 | 25° C. | 25% | 10 C | 10 sec | 3 | 30 sec | 5.3 | 0.78 | S confirmed |
| Example 8 | 20° C. | 60% | 5 C | 30 sec | 2 | 30 sec | 4.6 | 0.91 | Si confirmed |
| Example 9 | 45° C. | 70% | 10 C | 10 sec | 3 | 30 sec | 18.7 | 0.18 | Si confirmed |
| Example 10 | 25° C. | 80% | 10 C | 10 sec | 3 | 30 sec | 3.8 | 1.2 | Si confirmed |
| Example 11 | 25° C. | 80% | 10 C | 10 sec | 3 | 30 sec | 8 | 0.62 | None confirmed |
| Example 12 | 25° C. | 80% | 10 C | 10 sec | 3 | 30 sec | 10.1 | 0.59 | Si confirmed |
| Example 13 | 25° C. | 80% | 10 C | 10 sec | 3 | 30 sec | 8.5 | 0.51 | Si confirmed |
| Example 14 | 25° C. | 80% | 10 C | 10 sec | 3 | 30 sec | 7.7 | 0.53 | Si confirmed |
| Example 15 | 25° C. | 80% | 10 C | 10 sec | 3 | 30 sec | 5.2 | 0.68 | Si confirmed |
| Example 16 | 25° C. | 80% | 10 C | 10 sec | 3 | 30 sec | 10.2 | 0.62 | Si confirmed |
| Example 17 | 25° C. | 80% | 10 C | 10 sec | 3 | 30 sec | 9.9 | 0.6 | Si confirmed |
| Example 18 | 25° C. | 80% | 10 C | 10 sec | 3 | 30 sec | 6.7 | 2.5 | Si confirmed |
| Comparative Example 1 | | | (no treatment) | | | | 2.1 | 5.5 | Si confirmed |
| Comparative Example 2 | 60° C. | 100% | 10 C | 10 sec | 3 | 30 sec | 52.3 | 0.9 | Si confirmed |
| Comparative Example 3 | 0° C. | 80% | 10 C | 10 sec | 3 | 30 sec | 3 | 4.1 | Si confirmed |

<Evaluation>

Using each of the batteries prepared in Examples 1 to 18 and Comparative Examples 1 to 3, a charge-and-discharge cycle test was conducted in an environment of 45° C. Charging was performed in a constant-current-constant-voltage mode. The charging conditions of each cycle were as follows. The charging rate was 3 C. The charging voltage was set in accordance with the combination of the positive electrode active material and the negative electrode active material, and was set to 2.85 V in Examples 1 to 3 and 5 to 18 and Comparative Examples 1 to 3, while it was set to 2.8 V in Example 4. The charging termination condition was set to a point when the charge current reached 0.05 C current value. Discharging was performed in a constant current mode using 3 C as a discharge rate. The discharge end voltage was set to 1.5 V. The number of cycles performed in this cycle test was 1000.

The discharge capacity of the 1000th cycle for the battery was divided by the discharge capacity of the 1st cycle to evaluate a capacity retention ratio after 1000 cycles at 45° C. (capacity retention ratio=[ (discharge capacity of 1000th cycle)/(discharge capacity of 1st cycle)]×1006). The results are shown in Table 4 below.

TABLE 4

| | Capacity Retention Ratio after 1000 cycles of 45° C., 3C charge-and-discharge cycles |
|---|---|
| Example 1 | 87% |
| Example 2 | 85% |
| Example 3 | 82% |
| Example 4 | 80% |
| Example 5 | 90% |
| Example 6 | 84% |
| Example 7 | 90% |
| Example 8 | 83% |
| Example 9 | 81% |
| Example 10 | 82% |
| Example 11 | 83% |
| Example 12 | 86% |
| Example 13 | 81% |
| Example 14 | 88% |
| Example 15 | 79% |
| Example 16 | 89% |
| Example 17 | 92% |
| Example 18 | 83% |
| Comparative Example 1 | 75% |
| Comparative Example 2 | 70% |
| Comparative Example 3 | 69% |

As shown in Table 4, each nonaqueous electrolyte battery prepared in Examples 1 to 18 exhibited higher cycle life performance than each of the batteries prepared in Comparative Examples 1 to 3. The ratios $A_F/A_{Ti}+A_{Nb})$ shown in Table 3 indicates that an appropriate coating-film was formed on the negative electrode surface in Examples 1 to 18, whereas the coating-film was insufficient in Comparative Examples 1 and 3, and an excessive coating-film was formed in Comparative Example 2. Presumably from these results, in Examples 1 to 18, side reactions at the negative electrode were suppressed adequately by the coating-film that had been formed on the negative electrode surface in such a manner that the ratio $A_F/(A_{Ti}+A_{Nb})$ on the negative electrode surface was within the range from 3.5 to 50, and shift of operation window between the positive and negative electrodes was suppressed. Presumably in Comparative Examples 1 and 3, side reactions at the negative electrode had not been suppressed, due to the coating-film on the negative electrode surface being insufficient, and shift of operation window between the positive and negative electrodes could not be restrained; as a result, the positive electrode was brought to an overcharged state, resulting in deterioration. In Comparative Example 2, it is presumed that due to excessive reduction of the side reactions by the excessive coating-film on the negative electrode, shift of operation window in the direction opposite to that in Comparative Examples 1 and 3 had occurred, and the negative electrode was brought to an overcharged state, resulting in deterioration.

According to at least one embodiment and example described above, a secondary battery is provided. The secondary battery includes a positive electrode, a negative electrode, and an electrolyte. The negative electrode includes a niobium-titanium composite oxide. Fluorine atoms are at least partially present on a surface of the niobium-titanium composite oxide. According to X-ray photoelectron spectroscopy, a ratio $A_F/(A_{Ti}+A_{Nb})$ representing a relationship between an abundance ratio $A_F$ of fluorine atoms, abundance ratio $A_{Ti}$ of titanium atoms, and abundance ratio $A_{Nb}$ of niobium atoms on a surface of the negative electrode is within a range of 3.5 to 50. The secondary battery exhibits excellent life performance, even in cases where shallow charge-discharge cycles are repeated due to use at high output. In addition, the secondary battery can provide a battery pack excellent in cycle life performance when used at high output and a vehicle installed with this battery pack.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. A secondary battery comprising:
a positive electrode;
a negative electrode comprising a niobium-titanium composite oxide having fluorine atoms on at least part of a surface the niobium-titanium composite oxide; and
an electrolyte,
an abundance ratio $A_F$ of fluorine atoms, an abundance ratio $A_{Ti}$ of titanium atoms, and an abundance ratio $A_{Nb}$ of niobium atoms on a surface of the negative electrode according to X-ray photoelectron spectroscopy satisfying a relationship of $3.5 \leq A_F/(A_{Ti}+A_{Nb}) \leq 50$.

2. The secondary battery according to claim 1, further comprising a lithium-containing coating-film that at least partially covers the surface of the niobium-titanium composite oxide, wherein the abundance ratio $A_F$ and an abundance ratio $A_{Li}$ of lithium atoms on the surface of the negative electrode according to X-ray photoelectron spectroscopy satisfy a relationship of $0.2 \leq A_{Li}/A_F \leq 1$.

3. The secondary battery according to claim 1, wherein the negative electrode further comprises at least one selected from the group consisting of carboxymethyl cellulose, styrene-butadiene rubber, polyacrylic acid, polyacrylonitrile, acrylic copolymer, and urethane copolymer.

4. The secondary battery according to claim 1, wherein the electrolyte comprises a lithium salt containing fluorine.

5. The secondary battery according to claim 1, wherein the electrolyte comprises one or more carbonate compound selected from the group consisting of cyclic carbonates and linear carbonates, and one or more ester compound selected from the group consisting of ethyl acetate, methyl acetate, ethyl propionate, and methyl propionate.

6. The secondary battery according to claim 1, wherein the surface of the negative electrode comprises at least one selected from the group consisting of nitrogen atoms, sulfur atoms, and silicon atoms.

7. A battery pack comprising the secondary battery according to claim 1.

8. The battery pack according to claim 7, further comprising an external power distribution terminal and a protective circuit.

9. The battery pack according to claim 7, comprising plural of the secondary battery, the secondary batteries being electrically connected in series, in parallel, or in combination of in-series connection and in-parallel connection.

10. A vehicle comprising the battery pack according to claim 7.

11. The vehicle according to claim 10, wherein the vehicle comprises a mechanism configured to convert kinetic energy of the vehicle into regenerative energy.

* * * * *